US012626919B2

(12) United States Patent
Wu

(10) Patent No.: US 12,626,919 B2
(45) Date of Patent: May 12, 2026

(54) POSITIVE ACTIVE MATERIAL AND ELECTROCHEMICAL DEVICE CONTAINING SAME

(71) Applicant: Ningde Amperex Technology Limited, Ningde City (CN)

(72) Inventor: Xia Wu, Ningde City (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 512 days.

(21) Appl. No.: 18/076,489

(22) Filed: Dec. 7, 2022

(65) Prior Publication Data

US 2023/0118096 A1    Apr. 20, 2023

Related U.S. Application Data

(63) Continuation of application No. PCT/CN2021/098940, filed on Jun. 8, 2021.

(30) Foreign Application Priority Data

Jun. 8, 2020    (CN) .......................... 202010511491.1

(51) Int. Cl.
*H01M 4/525*    (2010.01)
*H01M 4/02*    (2006.01)
(Continued)

(52) U.S. Cl.
CPC ........... *H01M 4/525* (2013.01); *H01M 4/366* (2013.01); *H01M 4/505* (2013.01);
(Continued)

(58) Field of Classification Search
CPC ..................................................... H01M 4/525
See application file for complete search history.

(56) References Cited

U.S. PATENT DOCUMENTS 6,040,090 A * 3/2000 Sunagawa .............. C01G 53/42
                                                    429/231.95
8,067,118 B2   11/2011 Saito et al.
                    (Continued)

FOREIGN PATENT DOCUMENTS

CN        101573813 A    11/2009
CN        102447102 A    5/2012
                    (Continued)

OTHER PUBLICATIONS

Li et al. "Designing high-voltage and high-rate Li1-xNaxCoO2 by enlarging Li layer spacing." Electrochimica Acta 273 (2018): 145-153. (Year: 2018).*

(Continued)

*Primary Examiner* — Allison Bourke
*Assistant Examiner* — Kayla Elaine Clary
(74) *Attorney, Agent, or Firm* — WHDA, LLP

(57) ABSTRACT

A positive active material, containing a compound with a $P6_3mc$ space group. In an XRD pattern of the positive active material, a (002) crystal plane of the compound with the $P6_3mc$ space group is located between 17.5° and 19°, and a full width at half maximum of the (002) crystal plane falls between 0.05 and 0.1. The positive active material at a high voltage of 4.8 V exhibits a considerable discharge capacity and desirable structural reversibility and cycle stability.

14 Claims, 5 Drawing Sheets

$P6_3mc$, $Li_xNa_zCo_{1-y}M_yO_2$, $0.6<x<0.75$, $0\leq y<0.15$, $0\leq z<0.02$ $R\text{-}3m$, $LiCo_{1-a}R_aO_2$, $0\leq a<0.1$ Al current collector

(51) Int. Cl.
H01M 4/36 (2006.01)
H01M 4/505 (2010.01)
H01M 10/0525 (2010.01)

(52) U.S. Cl.
CPC ................. *H01M 2004/021* (2013.01); *H01M 2004/028* (2013.01); *H01M 10/0525* (2013.01)

(56) References Cited

U.S. PATENT DOCUMENTS

| | | | |
|---|---|---|---|
| 9,318,738 B2 | 4/2016 | Kim et al. | |
| 9,350,045 B2 | 5/2016 | Saito et al. | |
| 2006/0019151 A1* | 1/2006 | Imachi | H01M 10/4285 |
| | | | 429/231.95 |
| 2010/0104944 A1 | 4/2010 | Saito et al. | |
| 2011/0244332 A1* | 10/2011 | Saito | H01M 4/505 |
| | | | 429/224 |
| 2012/0082897 A1 | 4/2012 | Saito et al. | |
| 2013/0302681 A1* | 11/2013 | Lim | H01M 4/366 |
| | | | 429/213 |
| 2014/0079990 A1 | 3/2014 | Yanagida et al. | |
| 2014/0363736 A1* | 12/2014 | Kim | H01M 4/133 |
| | | | 429/223 |
| 2015/0236378 A1* | 8/2015 | Kuwajima | H01M 4/525 |
| | | | 429/188 |
| 2016/0315320 A1 | 10/2016 | Matsuda | |
| 2016/0351901 A1 | 12/2016 | Saito | |
| 2019/0198867 A1 | 6/2019 | Chang et al. | |
| 2022/0223862 A1* | 7/2022 | Wu | H01M 4/131 |

FOREIGN PATENT DOCUMENTS

| | | |
|---|---|---|
| CN | 103582971 A | 2/2014 |
| CN | 104321912 A | 1/2015 |
| CN | 105940534 A | 9/2016 |
| CN | 109980181 A | 7/2019 |
| WO | 2014/083848 A1 | 6/2014 |

OTHER PUBLICATIONS

Paulsen et al. "Layered LiCoO2 with a different oxygen stacking (O2 structure) as a cathode material for rechargeable lithium batteries." Journal of the Electrochemical Society 147.2 (2000): 508. (Year: 2000).*

Office Action dated Jun. 10, 2022, issued in counterpart CN application No. 202010511491.1 with English translation. (11 pages).

International Search Report dated Sep. 9, 2021, issued in counterpart International Application No. PCT/CN2021/098940, with English Translation. (8 pages).

\* cited by examiner

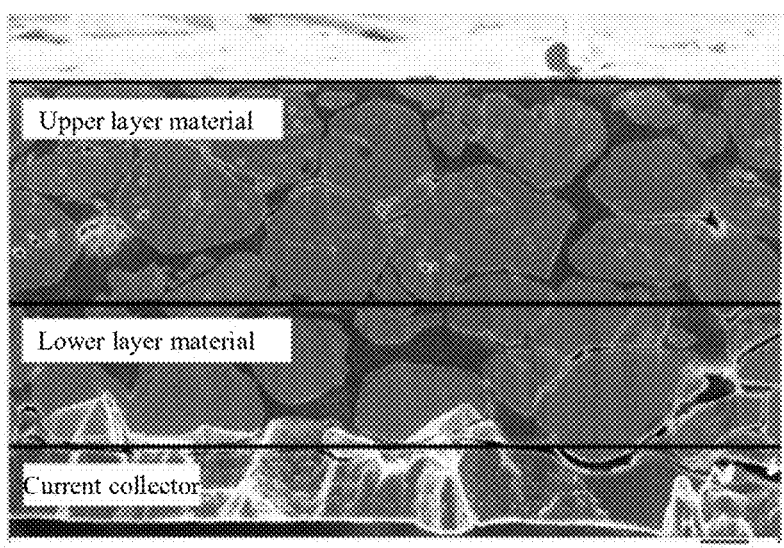
P6$_3$mc, Li$_x$Na$_z$Co$_{1-y}$M$_y$O$_2$, 0.6<x<0.75, 0≤y<0.15, 0≤z<0.02
R-3m, LiCo$_{1-a}$R$_a$O$_2$, 0≤a<0.1
Al current collector
FIG. 1
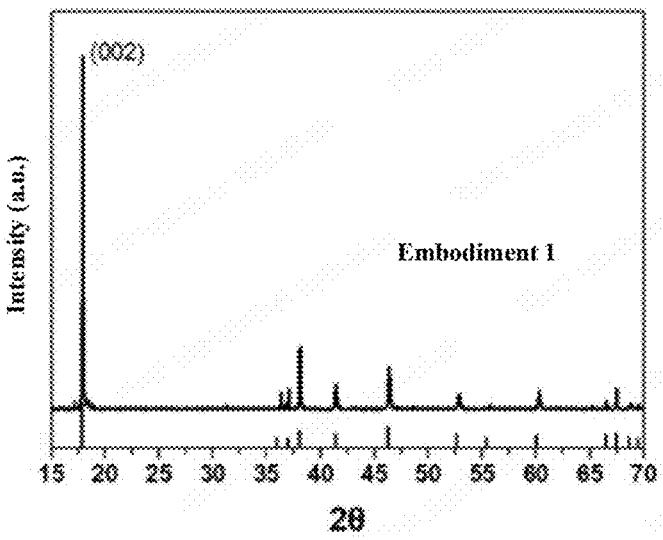
Upper layer material
Lower layer material
Current collector
FIG. 2
Intensity (a.u.)
(002)
Embodiment 1
2θ
15  20  25  30  35  40  45  50  55  60  65  70
FIG. 3A

POSITIVE ACTIVE MATERIAL AND ELECTROCHEMICAL DEVICE CONTAINING SAME

CROSS-REFERENCE TO RELATED APPLICATIONS

This present application is a continuation application of PCT application PCT/CN2021/098940, filed on Jun. 8, 2021, which claims priority to Chinese Patent Application No. 202010511491.1 filed on Jun. 8, 2020, the disclosure of which is hereby incorporated by reference in its entirety.

TECHNICAL FIELD

This application relates to the field of energy storage, and in particular, to a positive active material and an electrochemical device containing the positive active material, and especially a lithium-ion battery.

BACKGROUND

With popularization of electronic products such as a notebook computer, a mobile phone, a handheld game console, and a tablet computer, people are posing higher requirements on the battery of the products. Among multitudinous batteries, lithium-ion batteries are widely used in fields such as portable electronic products, electric transportation, national defense, aviation, and energy reserve by virtue of advantages such as a high energy storage density, a high power density, high safety, environmental friendliness, a long service life, a low self-discharge rate, and adaptability to a wide range of temperatures. As an important component of a lithium-ion battery, a positive electrode material exerts a significant impact on the performance of the battery. Therefore, it is essential to optimize and improve the positive electrode material continuously. With the upgrade of electronic products, the pursuit of a high energy density and a high power density has become a development trend of the positive electrode material of the lithium-ion battery: As the earliest commercialized lithium-ion positive electrode material, lithium cobalt oxide has been researched in depth extensively. The lithium cobalt oxide has exhibited the best overall performance in terms of reversibility, discharge capacity, charging efficiency, voltage stability, and the like, and has become a positive electrode material most massively used in the lithium-ion batteries currently. After decades of development, structural characteristics and electrochemical properties of the lithium cobalt oxide have been researched thoroughly, and a synthesis process and industrial production of the lithium cobalt oxide have become quite mature. By virtue of a relatively high discharge voltage plateau and a relatively high energy density, the lithium cobalt oxide has been in a dominant position in the positive electrode materials of the consumer lithium-ion batteries all along.

At present, the most prevalently commercially used LiCoO₂ positive electrode material in the 3C fieldis an O3-phase structure, this material is characterized by a theoretical capacity of 273.8 mAh/g, high cycle performance and safety performance, a high compacted density, and simplicity of manufacture. Since being put into commercial use by Sony Corporation in 1991, the $LiCoO_2$ positive electrode material has been in a dominant position in the market of lithium-ion battery materials all along. To achieve a higher specific capacity, $LiCoO_2$ shows a tendency toward cycling at a higher voltage (>4.6V vs. Li/Li⁺). When $LiCoO_2$ is charged until a voltage of 4.5 V, the capacity is no more than 190 mAh/g. People attempt to achieve a higher specific capacity by deintercalating more Lit from its crystal structure. However, when the voltage increases to a higher level, a large number of Lit ions are deintercalated, and the crystal structure undergoes a series of irreversible phase transitions (from an O3 phase to an H1-3 phase, and from an H1-3 phase to an O1 phase), thereby deteriorating the cycle performance and safety performance of the material drastically. In addition, when the voltage is high, side reactions intensify at an interface, and cobalt metal is dissolved out severely. However, the electrolytic solution technology is hardly adaptable to the high voltage, and a conventional electrolytic solution decomposes and fails more quickly at the high voltage, thereby leading to drastic fading of capacity.

Therefore, it is urgent to seek a positive electrode material characterized by a high specific capacity, a high voltage plateau, desirable structural reversibility, and a steady interface at a high voltage for lithium-ion batteries.

SUMMARY

This application provides a positive active material. The positive active material at a high voltage of 4.8 V exhibits a considerable discharge capacity and desirable structural reversibility and cycle stability.

In an embodiment, this application provides a positive active material. The positive active material contains a compound with a P6₃mc space group. In an XRD pattern of the positive active material, a (002) crystal plane of the compound with the P6₃mc space group is located between 17.5° and 19°, and a full width at half maximum of the (002) crystal plane falls between 0.05 and 0.1.

In some embodiments, in a DSC pattern of the positive active material, an exothermic peak of the compound with the P6₃mc space group exists between 250° C. and 400° C., and a full width at half maximum of the exothermic peak falls between 15° C. and 40° C.

In some embodiments, the compound with the P6₃mc space group satisfies at least one of conditions (a) to (e): (a) an average particle diameter of the compound with the P6₃mc space group is 8 μm to 30 μm: (b) a tap density of the compound with the P6₃mc space group is 2.2 g/cm³ to 3 g/cm³: (c) pores exist on a surface of a particle of the compound with the P6₃mc space group: (d) cracks exist inside the particle of the compound with the P6₃mc space group; and (e) the compound with the P6₃mc space group includes $Li_xNa_zCo_{1-y}M_yO_2$, where 0.6<x<0.85, 0≤y<0.15, 0≤z<0.03, and M comprises at least one selected from the group consisting of Al, Mg, Ti, Mn, Fe, Ni, Zn, Cu, Nb, Cr, and Zr.

The value of x in the condition (e) above varies depending on the charging or discharging state of the battery, and whether the active material contains a lithium-rich material.

The positive electrode material according to this application suppresses crystal structure collapse and interface failure of a conventional $LiCoO_2$ material during charging (>4.6V vs. Li/Li⁺). The material exhibits desirable structural reversibility and cycle stability at a high voltage, and achieves at least, but without being limited to, the following advantages: (1) during lithiation, lithium vacancies exist in a crystal structure of the $Li_xNa_zCo_{1-y}M_yO_2$ positive electrode material, and can well allow for volume changes and intercalation of more lithium; (2) during delithiation or lithiation, pores and cracks existent in the $Li_xNa_zCo_{1-y}MO_2$ positive electrode material can effectively release a huge stress formed during high-voltage delithiation or lithiation, suppress an irreversible slip between layers, and achieve high cycle performance; (2) (3) when the voltage is higher than 4.7 V, the $Li_xNa_zCo_{1-y}M_yO_2$ positive electrode material has completed deintercalation of 95% of lithium ions, and therefore, imposes a lower requirement on an oxidation-resistant (high-voltage) electrolytic solution than the positive electrode material in the O3 phase; (4) a tiny amount of Na is introduced during synthesis of the $Li_xNa_zCo_{1-y}M_yO_2$ positive electrode material, the Na occupies some sites of Li, and serves as a pillar to support the crystal structure, thereby enhancing the structural stability of the material; (4) (5) lithium ion migration energy of the $Li_xNa_zCo_{1-y}M_yO_2$ positive electrode material is lower than that of the $LiCoO_2$ in the O3 phase; and (6) an exemplary element M introduced in the $Li_xNa_zCo_{1-y}M_yO_2$ positive electrode material can enhance structural stability to some extent. In another aspect, this application provides an electrochemical device. The electrochemical device includes a positive electrode plate. The positive electrode plate includes a positive current collector and a positive active layer disposed on at least one surface of the positive current collector. The positive active layer includes any one of the positive active materials disclosed above (hereinafter referred to as "a first positive active material").

In some embodiments, the positive active layer further includes a second positive active material. The second positive active material is selected from the group consisting of $Li_{1\pm b}CO_{1-a}R_aO_2$ with an R-3m space group, a nickel-cobalt-manganese ternary material, a lithium-rich manganese-based material, and lithium manganese oxide, where $0 \leq b < 0.1$, $0 \leq a < 0.1$, and R comprises at least one selected from the group consisting of Al, Mg, Ti, Mn, Fe, Ni, Zn, Cu, Nb, Cr, and Zr.

The electrochemical device at a high voltage of 4.8 V exhibits excellent structural reversibility and cycle stability. On the one hand, the first positive active material makes up for the defect of the second positive active material used alone at a high voltage of 4.8 V, where the defect is: the interface is extremely unstable and prone to fail so that the capacity fades severely and the high-capacity stable cycling is unable to be implemented. On the other hand, the relatively high theoretical capacity of the second positive active material further increases the capacity of the electrochemical device. The electrochemical device can take advantage of the advantages of both materials to achieve an energy density higher than that of the materials that are currently mass-producible.

In some embodiments, the positive active layer includes a first layer and a second layer. The second layer is located between the current collector and the first layer. The first layer includes the first positive active material.

In some embodiments, the second layer includes a second positive active material, and a compacted density of the second layer is 4.1 $g/cm^3$ to 4.35 $g/cm^3$.

In some embodiments, a thickness ratio between the first layer and the second layer is 0.1 to 2.

In some embodiments, the positive active layer is a single-layer structure formed by mixing the first positive active material and the second positive active material. This application provides a positive active material. The positive active material is formed by mixing the first positive active material and the second positive active material.

Through research, it is found in this application that, at a high voltage, the cycle stability and structural reversibility of the foregoing lithium-ion battery prepared from the positive electrode plate with double-layered structure are further improved. Through research, it is found in this application that, by applying the positive active material containing the compound with the $P6_3mc$ space group onto a surface of a $LiCo_{1-a}R_aO_2$ positive active material with an R-3m space group (that is, the first layer includes the first positive active material, the second layer includes the second positive active material, and the second layer is located between the current collector and the first layer), this application can effectively suppress side reactions between the electrolytic solution and the surface of the active material in the second layer, and protect the interface of the active material in the second layer. Taking a composite positive active layer as an example in which the first layer is $Li_xNa_zCo_1-M_yO_2$ with a $P6_3mc$ space group and the second layer is $LiCo_{1-a}R_aO_2$ with an R-3m space group, the advantages of the composite positive active layer are as follows: (1) During delithiation or lithiation, due to inherent interface stability, the positive active material in the first layer can well isolate and preclude the electrolytic solution from corroding an active surface of the positive active material in the second layer, and maintain the interface stability; (2) during delithiation or lithiation, due to existence of pores and cracks in the positive active material in the first layer, the positive active material in the first layer can effectively release the huge stress formed by the high-voltage delithiation or lithiation, suppress the irreversible slip between layers, and achieve high cycle performance; (3) the positive active material in the first layer is of high flexibility and can be compacted arbitrarily without affecting the thickness of the composite positive active layer, and the compacted density of the composite positive active layer is high; and (4) the doping elements introduced into the positive active material in the first layer and the positive active material in the second layer can effectively enhance the crystal structure stabilization effect.

FIG. 1 is a schematic diagram of a positive electrode plate containing the foregoing double-layered positive active layer according to this application, where the positive current collector is not limited to an aluminum foil, but may be a nickel foil or other positive current collectors commonly used by a person skilled in the art. The positive active material in the second layer is not limited to $LiCo_{1-a}R_aO_2$ with an R-3m space group, but may be other positive electrode materials that need to be improved in terms of interface stability, cycle stability, or structural reversibility at a high voltage, including but not limited to: a nickel-cobalt-manganese ternary material, a lithium-rich manganese-base material, or lithium manganese oxide).

In some embodiments, a compacted density of the positive active layer is 4.0 $g/cm^3$ to 4.5 $g/cm^3$.

In some embodiments, the electrochemical device satisfies at least one of conditions (f) to (h): (f) a growth rate of cracked particles of the positive active material is not higher than 5% as measured by cycling the electrochemical device for 20 cycles at a voltage of 4.8 V and a current rate of 0.5 C when a discharge capacity per gram is not less than 180 mAh/g: (g) a growth rate of a direct current resistance DCR of the positive active material per cycle on average is lower than 2% as measured by cycling the electrochemical device for 20 cycles at a voltage of 4.8 V and a current rate of 0.5 C when the discharge capacity per gram is not less than 180 mAh/g; and (h) the electrochemical device further includes a negative electrode, the negative electrode includes a negative current collector and a negative active layer disposed on at least one surface of the negative current collector, and an increment of a packing concentration of cobalt packed on a surface of the negative active layer per cycle on average is denoted by R, as measured by cycling the electrochemical device for 20 cycles at a voltage of 4.8 V and a current rate of 0.5 C when the discharge capacity per gram is not less than 180 mAh/g, where R≤5 ppm.

In some embodiments, when the discharge capacity per gram of the electrochemical device is 180 mAh/g to 200 mAh/g, a thickness of a by-product of the positive electrode of the electrochemical device is denoted by η, where η≤0.5 μm.

According to another aspect, this application provides an electronic device. The electronic device includes any one of the electrochemical devices disclosed above.

Additional aspects and advantages of some embodiments of this application will be partly described or illustrated later herein or expounded through implementation of an embodiment of this application.

BRIEF DESCRIPTION OF DRAWINGS

For ease of describing an embodiment of this application, the following outlines the drawings needed for describing an embodiment of this application or the prior art. Evidently, the drawings outlined below are merely a part of embodiments in this application. Without making any creative efforts, a person skilled in the art can still derive the drawings of other embodiments according to the structures illustrated in these drawings.

FIG. 1 is a schematic structural diagram of a positive electrode plate containing a double-layered positive active layer according to some embodiments of this application;

FIG. 2 is a cross-section scanning electron microscope (SEM) image of secondary particles of a positive electrode plate according to Embodiment 1 of this application;

FIG. 3A is an X-ray diffraction (XRD) pattern of a positive active material according to Embodiment 1 of this application.

DETAILED DESCRIPTION

Figure 3B:
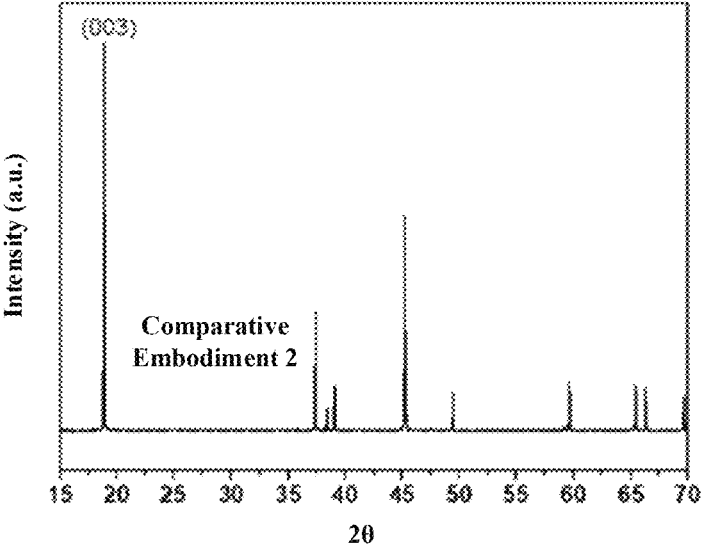
FIG. 3B is an X-ray diffraction (XRD) pattern of the positive active material according to Comparative Embodiment 1 of this application.

Some embodiments of this application will be described in detail below. The embodiments of this application should not be construed as a limitation on this application.

The term "approximately" used this application is intended to describe and represent small variations. When used together with an event or situation, the term "approximately" may represent an example in which the event or situation occurs exactly or an example in which the event or situation occurs very approximately. For example, when used together with a numerical value, the term "approximately" may represent a variation range falling within ±10% of the numerical value, such as ±5%, ±4%, ±3%, ±2%, ±1%, ±0.5%, ±0.1%, or ±0.05% of the numerical value.

In addition, a quantity, a ratio, or another numerical value herein is sometimes expressed in the format of a range. Understandably, such a range format is set out for convenience and brevity, and needs to be flexibly understood to include not only the numerical values explicitly specified and defined by the range, but also all individual numerical values or sub-ranges covered in the range as if each individual numerical value and each sub-range were explicitly specified.

In the description of specific embodiments and claims, a list of items referred to by using the terms such as "one of", "one thereof", "one type of" or other similar terms may mean any one of the listed items. For example, if items A and B are listed, the phrase "one of A and B" means A alone, or B alone. In another example, if items A, B, and C are listed, then the phrases "one of A, B, and C" and "one of A, B, or C" mean: A alone; B alone; or C alone. The item A may include a single element or a plurality of elements. The item B may include a single element or a plurality of elements. The item C may include a single element or a plurality of elements.

In the embodiments and claims, a list of items referred to by using the terms such as "at least one of", "at least one thereof", "at least one type of" or other similar terms may mean any combination of the listed items. For example, if items A and B are listed, the phrases "at least one of A and B" and "at least one of A or B" mean: A alone; B alone; or both A and B. In another example, if items A, B, and C are listed, the phrase "at least one of A, B, or C" means: A alone; B alone; C alone; A and B (excluding C); A and C (excluding B); B and C (excluding A); or all of A, B, and C. The item A may include a single element or a plurality of elements. The item B may include a single element or a plurality of elements. The item C may include a single element or a plurality of elements.

I. Positive Active Material

According to a first aspect of this application, this application provides a positive active material, containing a compound with a $P6_3mc$ space group. In an XRD pattern of the positive active material, a (002) crystal plane of the compound with the $P6_3mc$ space group is located between 17.5° and 19°, and a full width at half maximum of the (002) crystal plane falls between 0.05 and 0.1.

In some embodiments, in a DSC pattern of the positive active material, an exothermic peak of the compound with the $P6_3mc$ space group exists between 250° C. and 400° C., and a full width at half maximum of the exothermic peak falls between 15° C. and 40° C. In some embodiments, an exothermic peak of the compound with the $P6_3mc$ space group exists between 330° C. and 360° C. The DSC pattern is obtained by the following test method: putting an active material into a DSC test device (TOPEM TMDSC), and heating the powder of the active material at a speed of 10° C./min until 800° C., so as to obtain an exothermic curve.

In some embodiments, the compound with the $P6_3mc$ space group satisfies at least one of conditions (a) to (e):

(a) An average particle diameter of the compound with the $P6_3mc$ space group is 8 μm to 30 μm, and specifically may be 8 μm, 9 μm, 10 μm, 11 μm, 12 μm, 13 μm, 14 μm, 16 μm, 18 μm, 20 μm, 22 μm, 24 μm, 26 μm, or 28 μm, or a range formed by any two thereof. The average particle diameter $D_{50}$ of the positive active particles may be measured by using a Malvern particle size analyzer according to the following method: dispersing a specimen of the positive electrode material into a dispersant (ethanol or acetone, or another surfactant), performing ultrasonication for 30 minutes, and then adding the specimen into the Malvern particle size analyzer to start testing.

(b) A tap density of the compound with the $P6_3mc$ space group is 2.2 $g/cm^3$ to 3 $g/cm^3$, and specifically may be 2.2 $g/cm^3$, 2.3 $g/cm^3$, 2.4 $g/cm^3$, 2.5 $g/cm^3$, 2.6 $g/cm^3$, 2.7 $g/cm^3$, 2.8 $g/cm^3$, or 2.9 $g/cm^3$, or a range formed by any two thereof. The tap density is obtained according to the following method: putting a specimen of the compound into a 25 mL standard tapping graduated cylinder of an experimental FZS4-4B automatic tap densitometer, tapping the specimen for 3000 times, and recording the tap density.

(c) Pores exist on a surface of a particle of the compound with the $P6_3mc$ space group.

(d) Cracks exist inside the particle of the compound with the $P6_3mc$ space group.

(e) The compound with the $P6_3mc$ space group includes $Li_xNa_zCo_{1-y}M_yO_2$, where $0.6<x<0.85$, $0\leq y<0.15$, $0\leq z<0.03$, and M comprises at least one selected from the group consisting of Al, Mg, Ti, Mn, Fe, Ni, Zn, Cu, Nb, Cr, and Zr.

In some embodiments, x is 0.61, 0.63, 0.65, 0.67, 0.69, 0.71, 0.72, 0.73, 0.74, 0.75, 0.8, or a range formed by any two thereof. In some embodiments, $0.7\leq x<0.75$.

In some embodiments, y is 0.0002, 0.0004, 0.0006, 0.0008, 0.001, 0.002, 0.004, 0.005, 0.006, 0.008, 0.009, 0.014, 0.015, 0.016, 0.017, 0.019, 0.02, 0.025, 0.3, 0.4, 0.5, 0.6, 0.7, 0.8, 0.9, 1, 1.2, or a range formed by any two thereof.

In some embodiments, z is 0, 0.002, 0.003, 0.004, 0.006, 0.005, 0.008, 0.01, 0.015, 0.02, or a range formed by any two thereof.

In some embodiments, M comprises at least one selected from the group consisting of Al, Mg, and Ti. In some embodiments, M is Al. In some embodiments, M is Al and Mg, or is Al and Ti, or is Al, Mg, and Ti.

In some embodiments, the first positive active material includes particles that contain pores. The number of pores is m, and $m\geq 2$. In some embodiments, cracks exist in the particles of the first positive active material. The number of the cracks is n, and $0<n<30$. In some embodiments, the number of pores on the surface of each particle of the first positive active material is 1, 2, 5, 10, 15, or a range formed by any two thereof; and the number of cracks inside each particle is 4, 8, 12, 16, 20, 25, or a range formed by any two thereof. The number of pores on the surface of the particle is obtained by averaging the numbers of pores on the surfaces of a given number of particles after the particles are imaged by SEM. The number of cracks inside the particles is obtained by averaging the numbers of cracks inside a given number of particles after the particles are sectioned by using a cross-section polishing (CP) technology and then imaged by the SEM.

II. Electrochemical Device

According to a second aspect of this application, this application provides an electrochemical device. The electrochemical device includes a positive electrode plate. The positive electrode plate includes a positive current collector and a positive active layer disposed on at least one surface of the positive current collector. The positive active layer includes any one of the positive active materials containing a compound with a $P6_3mc$ space group disclosed above (hereinafter referred to as "a first positive active material").

In some embodiments, the positive active layer further includes a second positive active material. The second positive active material is selected from $Li_{1\pm b}Co_{1-a}R_aO_2$ with an R-3m space group, a nickel-cobalt-manganese ternary material, a lithium-rich manganese-based material, and lithium manganese oxide, where $0\leq b<0.1$, $0\leq a<0.1$, and R comprises at least one selected from the group consisting of Al, Mg, Ti, Mn, Fe, Ni, Zn, Cu, Nb, Cr, and Zr. In some embodiments, $0.001\leq a\leq 0.005$. In some embodiments, a is 0.002, 0.003, 0.004, or a range formed by any two thereof. In some embodiments, R comprises at least one selected from the group consisting of Al, Mg, and Ti. In some embodiments, R is Al.

In some embodiments, the positive active layer includes a first layer and a second layer. The second layer is located between the current collector and the first layer. The first layer includes the first positive active material.

In some embodiments, the second layer includes the second positive active material, and a compacted density of the second layer is 4.1 $g/cm^3$ to 4.35 $g/cm^3$.

In some embodiments, a thickness ratio between the first layer and the second layer is 0.1 to 2, and specifically may be 0.2, 0.3, 0.5, 0.7, 1.0, 1.3, 1.5, 1.7, or a range formed by any two thereof.

In some embodiments, a compacted density of the positive active layer is 4.0 $g/cm^3$ to 4.5 $g/cm^3$. In some embodiments, a resistance of the positive electrode is less than 3Ω.

In some embodiments, the electrochemical device satisfies at least one of conditions (f) to (h): (f) a growth rate of cracked particles of the positive active material is not higher than 5% as measured by cycling the electrochemical device for 20 cycles at a voltage of 4.8 V and a current rate of 0.5 C when a discharge capacity per gram is not less than 180 mAh/g: (g) a growth rate of a direct current resistance DCR of the positive active material per cycle on average is lower than 2% as measured by cycling the electrochemical device for 20 cycles at a voltage of 4.8 V and a current rate of 0.5 C when the discharge capacity per gram is not less than 180 mAh/g; and (h) the electrochemical device further includes a negative electrode plate, the negative electrode plate includes a negative current collector and a negative active layer disposed on at least one surface of the negative current collector, and an increment of a packing concentration of cobalt packed on a surface of the negative active layer per cycle on average is denoted by R, as measured by cycling the electrochemical device for 20 cycles at a voltage of 4.8 V and a current rate of 0.5 C when the discharge capacity per gram is not less than 180 mAh/g, where $R\leq 5$ ppm.

In some embodiments, the growth rate of cracked particles of the positive active material is not higher than at least one of 4%, 3%, or 2%, as measured by cycling the electrochemical device for 20 cycles at a voltage of 4.8 V and a current rate of 0.5 C when a discharge capacity per gram is not less than 180 mAh/g.

In some embodiments, the growth rate of a direct current resistance DCR of the positive active material per cycle on average is lower than at least one of 1.9%, 1.8%, 1.7%, 1.6%, 1.5%, 1.4%, and 1.3%, as measured by cycling the electrochemical device for 20 cycles at a voltage of 4.8 V and a current rate of 0.5 C when the discharge capacity per gram is not less than 180 mAh/g.

In some embodiments, an increment of a packing concentration of cobalt packed on a surface of the negative active layer per cycle on average is denoted by R, as measured by cycling the electrochemical device for 20 cycles at a voltage of 4.8 V and a current rate of 0.5 C when the discharge capacity per gram is not less than 180 mAh/g, where R is less than or equal to at least one of 4.58 ppm, 4.0 ppm, 3.5 ppm, 3 ppm, 2.5 ppm, and 2.0 ppm.

In some embodiments, when the discharge capacity per gram of the electrochemical device is 180 mAh/g to 200 mAh/g, a thickness of a by-product of the positive electrode of the electrochemical device is denoted by $\eta$, where $\eta \leq 0.5$ $\mu$m. In some embodiments, $\eta \leq 0.4$ $\mu$m. In some embodiments, $\eta \leq 0.3$ $\mu$m.

The electrochemical device includes any device in which an electrochemical reaction occurs. In some embodiments, the electrochemical device according to this application includes, but is not limited to: any type of primary battery, secondary battery, fuel battery, solar battery, or capacitor.

In some embodiments, the electrochemical device is a lithium secondary battery.

In some embodiments, the lithium secondary battery includes, but is not limited to, a lithium metal secondary battery, a lithium-ion secondary battery, a lithium polymer secondary battery, or a lithium-ion polymer secondary battery.

III. Electronic Device

According to a third aspect of this application, this application provides an electronic device. The electronic device may be any device that uses the electrochemical device according to an embodiment of this application.

In some embodiments, the electronic device includes, but is not limited to, a notebook computer, pen-inputting computer, mobile computer, e-book player, portable phone, portable fax machine, portable photocopier, portable printer, stereo headset, video recorder, liquid crystal display television set, handheld cleaner, portable CD player, mini CD-ROM, transceiver, electronic notepad, calculator, memory card, portable voice recorder, radio, backup power supply, motor, automobile, motorcycle, power-assisted bicycle, bicycle, lighting appliance, toy, game console, watch, electric tool, flashlight, camera, large household battery, lithium-ion capacitor, or the like.

IV. Method for Preparing an Electrochemical Device

According to a fourth aspect of this application, this application provides a method for preparing any one of the electrochemical devices described above. The method includes the following parts:

1. Preparing $Li_xNa_zCo_{1-y}M_yO_2$ with a P6$_3$mc Space Group, where $0.6<x<0.85$, $0\leq y<0.15$, $0\leq z<0.03$, and M Comprises at Least One Selected from the Group Consisting of Al, Mg, Ti, Mn, Fe, Ni, Zn, Cu, Nb, Cr, and Zr.

(1) Preparing an element M-doped $Co_{3-y}M_yO_4$ precursor by a liquid-phase precipitation process and a sintering process: Adding a soluble cobalt salt (such as cobalt chloride, cobalt acetate, cobalt sulfate, or cobalt nitrate) and an M salt (such as sulfate) at a molar ratio of (3-y):y between Co and M into a solvent (such as deionized water), and adding a precipitant (such as sodium carbonate or sodium hydroxide) and a complexant (such as ammonia) at a molar concentration of 0.1 to 3 mol/L, where a molar ratio between the complexant and the precipitant is 0.1 to 1. Adjusting the PH value (for example, to a value within a range of 5 to 9) to generate a precipitate. Sintering the precipitate at a temperature of 400° C. to 800° C. in the air for 5 to 20 hours, and grinding the sintered product to obtain a $Co_{3-y}M_yO_4$ powder, where $0\leq y<0.15$.

(2) Synthesizing $Na_mCo_{1-y}M_yO_2$ by a solid-phase sintering process: Mixing the $Co_{3-y}M_yO_4$ powder and the $Na_2CO_3$ powder at a molar ratio of 0.7:1 to 0.74:1 between Na and Co. Sintering the well mixed powder at a temperature of 700° C. to 1000° C. in an oxygen atmosphere for 36 to 56 hours to obtain $Na_mCo_{1-y}M_yO_2$ with a P6$_3$mc space group, where $0.6<m<1$.

(3) Synthesizing a $Li_xNa_zCo_{1-y}M_yO_2$ positive active material with a P6$_3$mc space group by an ion exchange process: Mixing $Na_mCo_{1-y}M_yO_2$ and a lithium-containing molten salt (such as lithium nitrate, lithium chloride, or lithium hydroxide) evenly at a molar ratio of 0.01 to 0.2 between Na and Li. Leaving the mixture to react at 200° C. to 400° C. in an air atmosphere for 2 to 8 hours, washing a reaction product several times with deionized water. Cleaning off the molten salt, and then drying the powder to obtain a $Li_xNa_zCo_{1-y}M_yO_2$ positive electrode material with a P6$_3$mc space group.

2. Preparing $LiCo_{1-a}R_aO_2$ with an R-3m Space Group, where $0\leq a<0.1$, and R Comprises at Least One Selected from the Group Consisting of Al, Mg, Ti, Mn, Fe, Ni, Zn, Cu, Nb, Cr, and Zr.

(1) Preparing an element R-doped $Co_{3-a}NaO_4$ precursor by a liquid-phase precipitation process and a sintering process: Adding a soluble cobalt salt (such as cobalt chloride, cobalt acetate, cobalt sulfate, or cobalt nitrate) and an R salt (such as sulfate) at a ratio into a solvent (such as deionized water), and adding a precipitant (such as sodium carbonate or sodium hydroxide) and a complexant (such as ammonia). Adjusting the PH value (for example, to a value within a range of 5 to 9) to generate a precipitate. Sintering the precipitate, and grinding the sintered product to obtain a $Co_{3-a}R_aO_4$ powder.

(2) Preparing $Li_{1\pm b}Co_{1-a}R_aO_2$ by a solid-phase sintering process: Mixing the $Co_{3-a}R_aO_4$ powder and $Li_2CO_3$ at a molar ratio of 1:1-a between lithium and cobalt. Mixing well, and sintering the mixture at 700° C. to 1200° C. in the air atmosphere for 6 to 48 hours. Cooling down the sintered product, and grinding and sieving the sintered product to obtain $LiCo_{1-a}R_aO_2$ with an R-3m space group, where $0\leq b<0.1$ and $0\leq a<0.1$.

3. Preparing a Positive Electrode Plate (1) Double-Layered Positive Electrode Plate Mixing well the $LiCo_{1-a}R_aO_2$ positive active material with an R-3m space group (or other positive active materials including but not limited to: a nickel-cobalt-manganese ternary material, a lithium-rich manganese-based material, or lithium manganese oxide), a conductive agent (such as acetylene black), and a binder (such as polyvinylidene difluoride (PVDF)) in a solvent (such as N-methyl-pyrrolidone) system at a mass ratio (such as 97:2:1) to obtain a slurry, and then coating a positive current collector (such as an aluminum foil) with the slurry. Performing drying to obtain an undercoat.

Mixing well the $Li_xNa_zCo_{1-y}M_yO_2$ positive active material with a P6$_3$mc space group, a conductive agent (such as acetylene black), and a binder (such as polyvinylidene difluoride (PVDF)) in a solvent (such as N-methyl-pyrrolidone) system at a mass ratio (such as 97:2:1) to obtain a slurry, and then coating the undercoat with the slurry. Performing drying and cold calendering to obtain a double-layered positive electrode plate.

(2) Single-Layered Positive Electrode Plate

Mixing well the $Li_xNa_zCo_{1-y}M_yO_2$ positive active material with a P6$_3$mc space group (or other positive active materials including but not limited to: $LiCo_{1-a}R_aO_2$ with an R-3m space group, a nickel-cobalt-manganese ternary material, a lithium-rich manganese-based material, or lithium manganese oxide), a conductive agent (such as acetylene black), and a binder (such as polyvinylidene difluoride (PVDF)) in a solvent (such as N-methyl-pyrrolidone) system at a mass ratio to obtain a slurry, and then coating a positive current collector (such as an aluminum foil) with the slurry. Performing drying and cold calendering to obtain a single-layered positive electrode plate.

4. Negative Electrode Plate

The negative electrode plate applicable to the electro-chemical device, and the composition and the manufacturing method of the negative electrode plate include any technology disclosed in the prior art.

In some embodiments, the negative electrode plate includes a negative current collector and a negative active material layer located on at least one surface of the negative current collector.

In some embodiments, the negative active material layer includes a binder. In some embodiments, the binder includes, but is not limited to: polyvinyl alcohol, carboxymethyl cellulose, hydroxypropyl cellulose, diacetyl cellulose, polyvinyl chloride, carboxylated polyvinyl chloride, poly-vinyl fluoride, a polymer containing ethylene oxide, poly-vinylpyrrolidone, polyurethane, polytetrafluoroethylene, poly(1,1-difluoroethylene), polyethylene, polypropylene, styrene-butadiene rubber, acrylic styrene-butadiene rubber, epoxy resin, or nylon.

In some embodiments, the negative active material layer includes a conductive material. In some embodiments, the conductive material includes, but is not limited to: natural graphite, artificial graphite, carbon black, acetylene black, Ketjen black, carbon fiber, metal powder, metal fiber, cop-per, nickel, aluminum, silver, or a polyphenylene derivative.

In some embodiments, the current collector includes, but is not limited to: a copper foil, a nickel foil, a stainless steel foil, a titanium foil, foamed nickel, foamed copper, or a conductive metal-clad polymer substrate.

In some embodiments, the negative electrode plate may be obtained by the following method: mixing an active material, a conductive material, and a binder in a solvent to prepare an active material composition, and coating the current collector with the active material composition.

In some embodiments, the solvent may include, but is not limited to N-methyl-pyrrolidone.

5. Electrolytic Solution

The electrolytic solution applicable to the embodiments of this application may be an electrolytic solution known in the prior art.

In some embodiments, the electrolytic solution includes an organic solvent, a lithium salt, and an additive. The organic solvent of the electrolytic solution according to this application may be any organic solvent known in the prior art suitable for use as a solvent of the electrolytic solution. An electrolyte used in the electrolytic solution according to this application is not limited, and may be any electrolyte known in the prior art. The additive in the electrolytic solution according to this application may be any additive known in the prior art suitable for use as an additive in the electrolytic solution.

In some embodiments, the organic solvent includes, but is not limited to: ethylene carbonate (EC), propylene carbonate (PC), diethyl carbonate (DEC), ethyl methyl carbonate (EMC), dimethyl carbonate (DMC), propylene carbonate, or ethyl propionate.

In some embodiments, the lithium salt includes at least one of an organic lithium salt or an inorganic lithium salt.

In some embodiments, the lithium salt includes, but is not limited to: lithium hexafluorophosphate ($LiPF_6$), lithium tetrafluoroborate ($LiBF_4$), lithium difluorophosphate ($LiPO_2F_2$), lithium bistrifluoromethanesulfonimide LiN $(CF_3SO_2)_2$ (LiTFSI), lithium bis(fluorosulfonyl)imide $Li(N(SO_2F)_2)$ (LIFSI), lithium bis(oxalato) borate $LiB(C_2O_4)_2$ (LiBOB), or lithium difluoro (oxalato) borate $LiBF_2(C_2O_4)$ (LiDFOB).

In some embodiments, a concentration of the lithium salt in the electrolytic solution is approximately 0.5 to 3 mol/L, approximately 0.5 to 2 mol/L, or approximately 0.8 to 1.5 mol/L.

6. Separator

In some embodiments, a separator is disposed between the positive electrode plate and the negative electrode plate to prevent a short circuit. The material and the shape of the separator applicable to an embodiment of this application are not particularly limited, and may be based on any technology disclosed in the prior art. In some embodiments, the separator includes a polymer or an inorganic compound or the like formed from a material that is stable to the electrolytic solution according to this application.

For example, the separator may include a substrate layer and a surface treatment layer. The substrate layer is a non-woven fabric, film or composite film, which, in each case, is of a porous structure. The material of the substrate layer is at least one selected from polyethylene, polypropyl-ene, polyethylene terephthalate, and polyimide. Specifically, the material of the substrate layer may be a polypropylene porous film, a polyethylene porous film, a polypropylene non-woven fabric, a polyethylene non-woven fabric, or a polypropylene-polyethylene-polypropylene porous compos-ite film.

The surface treatment layer is disposed on at least one surface of the substrate layer. The surface treatment layer may be a polymer layer or an inorganic compound layer, or a layer formed by mixing a polymer and an inorganic compound.

The inorganic compound layer includes inorganic par-ticles and a binder. The inorganic particles are one or more selected from alumina, silicon oxide, magnesium oxide, titanium oxide, hafnium dioxide, tin oxide, ceria, nickel oxide, zinc oxide, calcium oxide, zirconium oxide, yttrium oxide, silicon carbide, boehmite, aluminum hydroxide, mag-nesium hydroxide, calcium hydroxide, and barium sulfate. The binder is one or more selected from polyvinylidene fluoride, poly(vinylidene fluoride-co-hexafluoropropylene), polyamide, polyacrylonitrile, polyacrylate, polyacrylic acid, polyacrylate, polyvinylpyrrolidone, polyvinyl ether, poly methyl methacrylate, polytetrafluoroethylene, and poly-hexafluoropropylene.

The polymer layer includes a polymer. The material of the polymer is at least one selected from polyamide, polyacry-lonitrile, acrylate polymer, polyacrylic acid, polyacrylate, polyvinylpyrrolidone, polyvinyl ether, polyvinylidene fluo-ride, and poly(vinylidene fluoride-co-hexafluoropropylene).

By using a lithium-ion battery as an example, the prepa-ration method of a lithium-ion battery is described below with reference to specific embodiments. A person skilled in the art understands that the preparation methods described in this application are merely examples, and any other appro-priate preparation methods still fall within the scope of this application.

EMBODIMENTS

The following describes some embodiments and com-parative embodiments of preparing a lithium-ion battery according to this application, and evaluates performance of the lithium-ion batteries.

Embodiment 1

Preparing $Li_{0.73}Na_{0.02}CoO_2$ with a $P6_3mc$ Space Group

Step (1): Mixing tricobalt tetraoxide and sodium carbonate powder at a molar ratio of 0.75:1 between Na and Co. Sintering the well mixed powder at a temperature of 800° C. in an oxygen atmosphere for 46 hours to obtain $Na_{0.75}CoO_2$ with a $P6_3mc$ space group.

Step (2): Mixing $Na_{0.75}CoO_2$ and lithium nitrate well at a molar ratio of 0.75:5 between Na and Li. Leaving the mixture to react at 300° C. in an air atmosphere for 6 hours. Washing the reaction product several times with deionized water. Cleaning off the molten salt, and then drying the powder to obtain $Li_{0.73}Na_{0.02}CoO_2$ with a $P6_3mc$ space group.

Embodiment 2

Preparing $Li_{0.63}Co_{0.985}Al_{0.015}O_2$ with a $P6_3mc$ Space Group

Step (1): Preparing an Al-doped $(Co_{0.985}M_{0.015})_3O_4$ precursor in a liquid-phase precipitation process and a sintering process: adding cobalt chloride and aluminum sulfate at a molar ratio of Co:Al=0.985:0.015 into deionized water, adding sodium carbonate as a precipitant and ammonia as a complexant, adjusting the PH value to 7 to generate a precipitate, then sintering the precipitate at 600° C. for 7 hours, and grinding the sintered product to obtain $(Co_{0.985}M_{0.015})$ 304 powder.

Step (2): Mixing the $(Co_{0.985}Al_{0.015})_3O_4$ powder and sodium carbonate powder at a molar ratio of Na:Co=0.63:0.985; sintering the evenly mixed powder at 800° C. in an oxygen atmosphere for 46 hours to obtain $Na_{0.63}Co_{0.985}Al_{0.015}O_4$.

Step (3): Mixing the $Na_{0.63}Co_{0.985}Al_{0.015}O_4$ powder and lithium nitrate well at a molar ratio of 0.63:5 between Na and Li. Leaving the mixture to react at 300° C. in an air atmosphere for 6 hours. Washing the reaction product several times with deionized water. Cleaning off the molten salt, and drying the powder to obtain $Li_{0.63}Co_{0.985} Al_{0.015}O_2$ with a $P6_3mc$ space group.

Embodiment 3

Preparing $Li_{0.63}Na_{0.01}Co_{0.985}Al_{0.015}O_2$ with a $P6_3mc$ Space Group Step (1): Adding cobalt chloride and aluminum sulfate at a molar ratio of Co:Al=0.985:0.015 into deionized water, adding sodium carbonate as a precipitant and ammonia as a complexant, adjusting the PH value to 7 to generate a precipitate, then sintering the precipitate at 600° C. for 7 hours, and grinding the sintered product to obtain $(Co_{0.985}Al_{0.015})_3O_4$ powder.

Step (2): Mixing the $(Co_{0.985}Al_{0.015})_3O_4$ powder and sodium carbonate powder at a molar ratio of Na:Co=0.64:0.985; sintering the evenly mixed powder at 800° C. in an oxygen atmosphere for 46 hours to obtain $Na_{0.64}Co_{0.985}Al_{0.015}O_2$.

Step (3): Mixing the $Na_{0.64}Co_{0.985}Al_{0.015}O_2$ and lithium nitrate well at a molar ratio of 0.64:5 between Na and Li. Leaving the mixture to react at 300° C. in an air atmosphere for 6 hours. Washing the reaction product several times with deionized water. Cleaning off the molten salt, and drying the powder to obtain $Li_{0.63}Na_{0.01}Co_{0.985}Al_{0.015}O_2$ with a $P6_3mc$ space group.

Embodiments 4 to 16

The preparation method in Embodiments 4 to 16 is basically identical to that in Embodiment 3, but differs in the type and/or content of the doping element M.

Table 1 below sets out detailed chemical formulas used in Embodiments 1 to 16.

TABLE 1

| Serial number | Chemical formula |
|---|---|
| Embodiment 1 | $Li_{0.73}Na_{0.02}CoO_2$ |
| Embodiment 2 | $Li_{0.63}Co_{0.985}Al_{0.015}O_2$ |
| Embodiment 3 | $Li_{0.63}Na_{0.01}Co_{0.985}Al_{0.015}O_2$ |
| Embodiment 4 | $Li_{0.69}Na_{0.01}Co_{0.985}Al_{0.015}O_2$ |
| Embodiment 5 | $Li_{0.72}Na_{0.01}Co_{0.985}Al_{0.015}O_2$ |
| Embodiment 6 | $Li_{0.73}Na_{0.01}Co_{0.985}Al_{0.015}O_2$ |
| Embodiment 7 | $Li_{0.74}Na_{0.008}Co_{0.98}Al_{0.02}O_2$ |
| Embodiment 8 | $Li_{0.74}Na_{0.006}Co_{0.975}Al_{0.025}O_2$ |
| Embodiment 9 | $Li_{0.74}Na_{0.006}Co_{0.991}Mg_{0.009}O_2$ |
| Embodiment 10 | $Li_{0.74}Na_{0.01}Co_{0.986}Mg_{0.014}O_2$ |
| Embodiment 11 | $Li_{0.74}Na_{0.006}Co_{0.983}Al_{0.015}Mg_{0.002}O_2$ |
| Embodiment 12 | $Li_{0.74}Na_{0.005}Co_{0.981}Al_{0.018}Mg_{0.001}O_2$ |
| Embodiment 13 | $Li_{0.74}Na_{0.004}Co_{0.984}Al_{0.015}Ti_{0.001}O_2$ |
| Embodiment 14 | $Li_{0.74}Na_{0.004}Co_{0.992}Al_{0.007}Ti_{0.001}O_2$ |
| Embodiment 15 | $Li_{0.74}Na_{0.003}Co_{0.995}Al_{0.003}Mg_{0.001}Ti_{0.001}O_2$ |
| Embodiment 16 | $Li_{0.74}Na_{0.003}Co_{0.994}Al_{0.003}Mg_{0.002}Ti_{0.001}O_2$ |

Embodiment 17

Preparing $Li_{0.73}Na_{0.01}Co_{0.985}Al_{0.015}O_2$ with a $P6_3mc$ Space Group The steps in Embodiment 17 are basically identical to those in Embodiment 6 except that, in Embodiment 17, the sintering temperature and the ingredient mixing method in step 1 are controlled to obtain a $P6_3mc$ structured $Li_{0.73}Na_{0.01}Co_{0.985}Al_{0.015}O_2$ that possesses a different average particle diameter ($D_{50}$) and a different tap density.

Embodiment 18

Preparing $Li_{0.73}Na_{0.01}Co_{0.985}Al_{0.015}O_2$ with a $P6_3mc$ Space Group The steps in Embodiment 18 are basically identical to those in Embodiment 6 except that, in Embodiment 18, the sintering temperature and the ingredient mixing method in step 1 are controlled to obtain a $P6_3mc$ structured $Li_{0.73}Na_{0.01}Co_{0.985}Al_{0.015}O_2$ that possesses a different average particle diameter ($D_{50}$) and a different tap density, without pores on the surface of particles.

Embodiment 19

Preparing $Li_{0.73}Na_{0.01}Co_{0.985}Al_{0.015}O_2$ with a $P6_3mc$ Space Group The steps in Embodiment 19 are basically identical to those in Embodiment 6 except that, in Embodiment 19, the sintering temperature and the ingredient mixing method in step 1 are controlled to obtain a $P6_3mc$ structured $Li_{0.73}Na_{0.01}Co_{0.985}Al_{0.015}O_2$ that possesses a different average particle diameter ($D_{50}$) and a different tap density, without cracks inside the particles.

Embodiment 20

Preparing $Li_{0.73}Na_{0.01}Co_{0.985}Al_{0.015}O_2$ with a $P6_3mc$ Space Group The steps in Embodiment 20 are basically identical to those in Embodiment 6 except that, in Embodiment 20, the sintering temperature and the ingredient mixing method in step 1 are controlled to obtain a $P6_3mc$ structured $Li_{0.73}Na_{0.01}Co_{0.985}Al_{0.015}O_2$ that possesses a different average particle diameter ($D_{50}$) and a different tap density.

Table 2 below shows detailed values of $D_{50}$ and the tap density of the positive active material, and shows whether pores exist on the surface of the particles and whether cracks exist inside the particles of the positive active material in Embodiment 6 and Embodiments 17 to 20.

TABLE 2

| Serial number | $D_{50}$ (μm) | Tap density (g/cm³) | Pores existent | Cracks existent |
|---|---|---|---|---|
| Embodiment 6 | 12 | 2.7 | Yes | Yes |
| Embodiment 17 | 9 | 2.2 | Yes | Yes |
| Embodiment 18 | 12 | 2.7 | No | Yes |
| Embodiment 19 | 12 | 2.7 | Yes | No |
| Embodiment 20 | 12 | 2.2 | Yes | Yes |

Comparative Embodiment 1

Preparing $Li_{0.58}Na_{0.01}Co_{0.985}Al_{0.015}O_2$ with a Non-P6₃mc Space Group Step (1): Adding cobalt chloride and aluminum sulfate at a molar ratio of 0.985:0.015 between Co and Al into deionized water. Adding sodium carbonate as a precipitant and ammonia as a complexant. Adjusting the PH value to 7 to generate a precipitate. Sintering the precipitate, and grinding the sintered product to obtain $(Co_{0.985}Al_{0.015})_3O_4$ powder.

Step (2): Mixing the $(Co_{0.985}Al_{0.015})_3O_4$ powder and lithium carbonate well at a molar ratio of 0.58:0.985 between Li and Co. Sintering the mixture at 1000° C. in the air for 12 hours. Cooling down the sintered product, and grinding and sieving the sintered product to obtain $Li_{0.58}Na_{0.01}Co_{0.985}Al_{0.015}O_2$ with an R-3m space group.

Comparative Embodiment 2

Preparing $Li_{0.8}Na_{0.006}Co_{0.983}Al_{0.015}Mg_{0.002}O_2$ with a Non-P6₃mc Space Group Step (1): Adding cobalt chloride, aluminum sulfate, and magnesium sulfate at a molar ratio of Co:Al:Mg=0.983:0.015:0.002 into deionized water, adding sodium carbonate as a precipitant and ammonia as a complexant, adjusting the PH value to 7 to generate a precipitate, then sintering the precipitate, and grinding the sintered product to obtain $(Co_{0.983}Al_{0.015}Mg_{0.002})_3O_4$ powder.

Step (2): Mixing the $(Co_{0.983}Al_{0.015}Mg_{0.002})_3O_4$ powder and lithium carbonate well at a molar ratio of 0.8:0.983 between Li and Co. Sintering the mixture at 1000° C. in the air for 12 hours. Cooling down the sintered product, and then grinding and sieving the sintered product to obtain $Li_{0.8}Na_{0.006}Co_{0.983}Al_{0.015}Mg_{0.002}O_2$ with an R-3m space group.

Comparative Embodiment 3

Preparing $Li_{0.55}Na_{0.004}Co_{0.984}Al_{0.015}Ti_{0.001}O_2$ with a Non-P6₃mc Space Group Step (1): Adding cobalt chloride, aluminum sulfate, and titanium nitrate at a molar ratio of Co:Al:Ti=0.984:0.015:0.001 into deionized water, adding sodium carbonate as a precipitant and ammonia as a complexant, adjusting the PH value to 7 to generate a precipitate, then sintering the precipitate, and grinding the sintered product to obtain $(Co_{0.984}Al_{0.015}Ti_{0.001})_3O_4$ powder.

Step (2): Mixing the $(Co_{0.984}Al_{0.015}Ti_{0.001})_3O_4$ powder and lithium carbonate well at a molar ratio of 0.55:0.984 between Li and Co. Sintering the mixture at 1000° C. in the air for 12 hours. Cooling down the sintered product, and then grinding and sieving the sintered product to obtain $Li_{0.55}Na_{0.004}Co_{0.984}Al_{0.015}Ti_{0.001}O_2$ with an R-3m space group.

Comparative Embodiment 4

Preparing $Li_{0.57}Na_{0.003}Co_{0.994}Al_{0.003}Mg_{0.002}Ti_{0.001}O_2$ with a Non-P6₃mc Space Group Step (1): Adding cobalt chloride, aluminum sulfate, magnesium sulfate, and titanium nitrate at a molar ratio of 0.994:0.003:0.002:0.001 between Co, Al, Mg, and Ti into deionized water, and adding sodium carbonate as a precipitant and ammonia as a complexant. Adjusting the PH value to 7 to generate a precipitate. Sintering the precipitate, and grinding the sintered product to obtain $(Co_{0.994}Al_{0.003}Mg_{0.002}Ti_{0.001})_3O_4$ powder.

Step (2): Mixing the $(Co_{0.994}Al_{0.003}Mg_{0.002}Ti_{0.001})_3O_4$ powder and lithium carbonate well at a molar ratio of 0.57:0.994 between Li and Co. Sintering the mixture at 1000° C. in the air for 12 hours. Cooling down the sintered product, and grinding and sieving the sintered product to obtain $Li_{0.57}Na_{0.003}Co_{0.994}Al_{0.003}Mg_{0.002}Ti_{0.001}O_2$ with an R-3m space group.

Performance Test Methods

To test the electrochemical performance of the positive electrode plate, a lithium-ion battery is prepared according to the following steps. The corresponding electrochemical performance of each lithium-ion battery is tested.

Positive electrode plate: Mixing well the positive active material prepared in the foregoing embodiments and comparative embodiments, acetylene black as a conductive agent, and polyvinylidene difluoride (PVDF) as a binder in an N-methyl-pyrrolidone solvent system at a mass ratio of 97:2:1 to obtain a slurry. Coating a positive current collector aluminum foil with the slurry, and performing drying and cold calendering to obtain a positive electrode plate that contains a single-layered positive active layer (hereinafter referred to as "single-layered positive electrode plate").

Negative electrode plate: Mixing well artificial graphite as an active material, acetylene black as a conductive agent, styrene butadiene rubber (SBR) as a binder, sodium carboxymethyl cellulose (CMC) as a thickener in a deionized water solvent system at a mass ratio of approximately 95:2:2:1 to obtain a slurry. Coating a copper foil with the slurry, and performing drying and cold calendering to obtain a negative electrode.

Electrolytic solution: In an argon atmosphere glovebox in which the water content is less than 10 ppm, mixing well ethylene carbonate (EC for short), diethyl carbonate (DEC for short), and propylene carbonate (PC for short) at a mass ratio of 2:6:2. Dissolving thoroughly dried lithium salt $LiPF_6$ in the foregoing solvent in which the content of $LiPF_6$ is 1 mol/L, and adding 1.5 wt % 1,3-propane sultone, 3 wt % fluoroethylene carbonate, and 2 wt % adiponitrile. The content of each ingredient is a percentage of the ingredient based on the total mass of the electrolytic solution.

Separator: Using a PE porous polymer film as a separator.

Stacking the positive electrode plate, the separator, and the negative electrode plate in sequence so that the separator is located between the positive electrode and the negative electrode to serve a purpose of isolation. Winding the stacked structure to obtain an electrode assembly. Putting the electrode assembly into an outer package, and injecting the prepared electrolytic solution. Sealing the package, and performing steps such as chemical formation, degassing, and edge trimming to obtain a battery.

Preparing a Lithium-Ion Half Battery (Button Battery)

Preparing a half battery by using almost the same method as the battery preparation method described above, except the following differences:

(1) Preparing a positive electrode: Selecting randomly a region coated with an active material layer from the front side and the back side, separately, of the current collector in the positive electrode of the battery.

Washing the region with dimethyl carbonate (DMC) to remove the active material layer on one side to obtain a single-side-coated positive electrode plate.

(2) Preparing a negative electrode: Using a metal lithium film as a negative electrode, where a single side of the metal lithium film is attached to the current collector copper foil. In a drying room, cutting the metal lithium film, and welding a negative tab to obtain a negative electrode plate.

Preparing a button battery by using the positive electrode and the lithium metal negative electrode. When the PE porous polymer film is used as a separator located between the positive electrode plate and the lithium metal negative electrode plate, injecting the prepared electrolytic solution to obtain a button battery.

SEM Test

The scanning electron microscopy (SEM) is a process of obtaining a morphology of a specimen by imaging based on secondary electron signals through interaction between an electron beam and the specimen. Analyzing the morphology and element distribution of the specimen by using a JSM-6360LV scanning electron microscope manufactured by JEOL and an accessory X-ray energy dispersive spectrometer.

Method for Testing the Growth Rate of Cracking

Perform a first charge-and-discharge cycle in a 25° C. environment. Charging the battery at a constant current of 0.5 C (a current at which the theoretic capacity of the battery is fully discharged within 2 hours) until the voltage reaches an upper limit of 4.8 V. Subsequently, discharging the battery at a constant current of 0.5 C until the voltage finally reaches 3 V. Recording the first-cycle discharge capacity. Repeating the charge-and-discharge steps until the $20^{th}$ cycle.

Processing the positive electrode plate by use of an ion beam cross section polisher (model: JEOL-IB-09010CP) after the battery completes the first cycle and the $20^{th}$ cycle separately, so as to obtain a cross section of the electrode plate. Shooting an SEM image of the cross section at a magnification not less than 5.0 K by using an SEM. Counting the particles that meet the conditions within the shooting range. The particles with cracks in the cross section are regarded as cracked particles. In the cross section of the particles in the image, a line that is continuously not less than 0.5 μm in length and not less than 0.1 μm in width and that extends from the particle surface toward the interior of the particle is regarded as a crack. Recording the total number of cracked particles among 50 to 100 particles. Counting the total number of cracked particles after the first cycle and the 20th separately, and calculating the growth rate of cracked particles according to the following formula:

Growth rate of cracked particles=(total number of cracks after the $20_{th}$ cycle−total number of cracks after the first cycle)/total number of cracks after the first cycle×100%.

Method for Testing a Compacted Density

Discharging the battery to a 0% state of charge (SOC), disassembling the battery, and washing and drying the positive electrode. Taking a piece (covering an area of A) of the positive electrode as a specimen, and weighing the specimen with an electronic balance to obtain a weight $W_1$ (both sides of the positive current collector are coated with a positive active material layer). Measuring a thickness $T_1$ of the positive electrode with a high-precision micrometer. Washing off the positive active material layer by using a solvent. Drying the positive current collector, weighing the positive current collector to obtain a weight $W_2$. Measuring a thickness $T_2$ of the positive current collector with a high-precision micrometer. Calculating the weight $W_0$, the thickness $T_0$, and the compacted density of the positive active material layer disposed on one side of the positive current collector according to the following formula:

$$W_0=(W_1-W_2)/2$$

$$T_0=(T_1-T_2)/2$$

$$\text{Compacted density}=W_0/(T_0 \times A).$$

Method for Testing the Capacity Fading Rate/Retention Rate

Performing charge-and-discharge steps for a first cycle in a 25° C. environment. Charging the battery at a constant current of 0.5 C (a current at which the theoretic capacity of the battery is fully discharged within 2 hours) until the voltage reaches an upper limit of 4.8 V. Subsequently, discharging the battery at a constant current of 0.5 C until the voltage finally reaches 3 V. Recording the first-cycle discharge capacity. Repeating the charge and discharge steps until an $N^{th}$ cycle (N depends on actual needs), and recording $N^{th}$-cycle discharge capacity. Calculating the $N^{th}$-cycle capacity fading rate and capacity retention rate of the lithium-ion battery according to the following formula:

$$N^{th}\text{-cycle capacity fading rate}=(\text{first-cycle discharge}$$
$$\text{capacity}-N^{th}\text{-cycle discharge capacity})/\text{first-}$$
$$\text{cycle discharge capacity}\times100\%.$$

$$N^{th}\text{-cycle capacity retention rate}=20^{th}\text{-cycle dis-}$$
$$\text{charge capacity/first-cycle discharge capacity}\times$$
$$100\%.$$

Method for Testing the Thickness of the First Layer and the Second Layer

Selecting a position of the positive electrode randomly, and processing the electrode plate at the selected position by using an ion beam cross section polisher (model: JEOL-IB-09010CP) to obtain a cross section of the electrode plate. Shooting an SEM image of the cross section at a magnification not less than 5.0 K by using an SEM (Zeiss Sigma 02-33). Drawing three parallel lines from the highest point of the current collector, the lowest point of a particle with pores and cracks, and the highest point of the positive electrode separately. A distance between the highest point of the current collector and the lowest point of the particle with pores and cracks is the thickness of the second layer. A distance between the lowest point of the particle with pores and cracks and the highest point of the positive electrode is the thickness of the first layer. Referring to FIG. 2.

Testing the Direct Current Resistance (DCR)

1) Fully charging the lithium-ion battery until a voltage of 4.8 V at a current density of 10 mA/g. Leaving the battery to stand for 10 minutes. Discharging the battery at a current density of 10 mA/g until the voltage reaches 3.0 V. Recording the obtained capacity C. 2) Leaving the battery to stand for 5 minutes. Charging the battery at a constant current of 0.7 C until the voltage reaches 4.8 V, and then charging the battery at a constant voltage of 4.8 V until the current drops below 0.05 C. 3) Leaving the battery to stand for 10 minutes, and then discharging the battery at a current of 0.1 C for 3 hours. 4) Discharging the battery at a current of 1 C for 1 second. Collecting the data of the direct current resistance before the cycling and at the end of the $20^{th}$ cycle or until the discharge capacity per gram is lower than 180 mAh/g. Averaging out the data before the cycling and the data after the cycling separately, and calculating an average growth rate according to the following formula:

$20^{th}$-cycle average DCR growth rate=($20^{th}$-cycle direct current resistance–direct current resistance before cycling)/direct current resistance before cycling×100%

$20^{th}$-cycle DCR growth rate per cycle on average=$20^{th}$-cycle average DCR growth rate/20.

Testing the Thickness of the by-Product

Selecting a position of the positive electrode plate randomly, processing the electrode plate at the selected position by using an ion beam cross section polisher (model: JEOL-IB-09010CP) to obtain a cross section of the electrode plate. Shooting an SEM image of the cross section at a magnification not less than 5.0 K by using an SEM (Zeiss Sigma 02-33). Selecting a particle that is not less than 5 μm in diameter and that is located inside the positive electrode plate rather than on an upper surface. Drawing parallel lines from a lowest point and a highest point of the by-product at the thickest position of the by-product located on the same particle. The distance between the parallel lines is the thickness of the by-product of the particle. Testing all particles that meet the test conditions, measuring the thickness at 20 points, and recording the thickness values. Averaging out the values as the thickness of the by-product.

Testing the Packing Concentration of Cobalt

Selecting 2 batteries from the same batch, and discharging the 2 batteries simultaneously at a current density of 10 mA/g in a 25° C. environment until the voltage reaches 3 V and the batteries reach a fully discharged state. The battery passes the test if the capacity of the battery is not less than 200 mAh/g. Disassembling one of the batteries, and stamping the negative electrode to obtain 20 disks of 100 mm$^2$ in size as specimens. Performing an inductively coupled plasma mass spectrometry (ICP-MS) test to obtain a packing concentration of cobalt of each specimen. Averaging out the values of the specimens to obtain an initial packing concentration of cobalt.

Further charging and discharging the other battery for 20 cycles in a 25° C. environment, with the voltage falling between 3.0 V and 4.8 V. Disassembling the battery, and stamping the negative electrode to obtain 20 disks of 100 mm$^2$ in size as specimens. Performing an inductively coupled plasma mass spectrometry (ICP-MS) test to obtain a packing concentration of cobalt of each specimen. Averaging out the values of the specimens to obtain an after-cycling packing concentration of cobalt.

Subtracting the initial packing concentration of cobalt from the after-cycling packing concentration of cobalt ions to obtain a difference, and then dividing the difference by the number of cycles to obtain an increment of packing concentration of cobalt per cycle.

Charging and discharging the battery for 20 cycles at a current density of 10 mA/g in a 25° C. environment, with the voltage falling between 3.0 V and 4.8 V. Performing an inductively coupled plasma mass spectrometry (ICP-MS) test on the positive electrode plate before and after each cycle separately to obtain a packing concentration of cobalt. Averaging out the obtained values.

Testing the State of Charge (SOC)

Performing a charge-and-discharge test on a battery at a current density of 10 mA/g in a 25° C. environment, with the voltage falling between 3.0 V and 4.8 V. SOC is a value obtained by dividing the capacity value at any point on a charge-discharge curve by a maximum charge-discharge capacity value.

Table 3 below shows the peak positions and the full width at half maximum of the (002) and/or (003) crystal planes of the materials in Embodiments 1 to 16 versus Comparative Embodiments 1 to 4, the first-cycle discharge capacity of the lithium-ion battery prepared from the materials, and the $100^{th}$-cycle capacity retention rate of the battery (the test method and test conditions are identical to those in the section headed "Method for testing the capacity fading rate/retention rate").

TABLE 3

| Serial number | Peak position of (002) and/or (003) crystal plane | Full width at half maximum of (002) and/or (003) crystal plane | First-cycle discharge capacity (mAh/g) | Capacity retention rate |
|---|---|---|---|---|
| Embodiment 1 | 17.7° | 0.06 | 237 | 89% |
| Embodiment 2 | 18° | 0.065 | 239 | 90% |
| Embodiment 3 | 17.5° | 0.06 | 239 | 91% |
| Embodiment 4 | 17.55° | 0.065 | 239.5 | 90.50% |
| Embodiment 5 | 17.58° | 0.068 | 240 | 90% |
| Embodiment 6 | 17.59° | 0.069 | 242 | 89.90% |
| Embodiment 7 | 17.6° | 0.07 | 245 | 90% |
| Embodiment 8 | 17.6° | 0.07 | 249 | 88% |
| Embodiment 9 | 17.6° | 0.07 | 241 | 91% |
| Embodiment 10 | 17.6° | 0.07 | 239 | 90.90% |
| Embodiment 11 | 17.6° | 0.07 | 243 | 89% |
| Embodiment 12 | 17.6° | 0.07 | 243 | 88% |
| Embodiment 13 | 17.6° | 0.07 | 248 | 90.50% |
| Embodiment 14 | 17.6° | 0.07 | 249 | 91% |
| Embodiment 15 | 17.6° | 0.07 | 241 | 90.90% |
| Embodiment 16 | 17.6° | 0.07 | 241 | 89% |
| Comparative Embodiment 1 | 16.8° | 0.12 | 245 | 50% |
| Comparative Embodiment 2 | 19.2° | 0.11 | 243 | 48% |
| Comparative Embodiment 3 | 16.5° | 0.11 | 242 | 38% |

TABLE 3-continued

| Serial number | Peak position of (002) and/or (003) crystal plane | Full width at half maximum of (002) and/or (003) crystal plane | First-cycle discharge capacity (mAh/g) | Capacity retention rate |
|---|---|---|---|---|
| Comparative Embodiment 4 | 16.2° | 0.11 | 245 | 47% |

Analysis of the XRD data in Table 3 shows that the (002) crystal plane of the $Li_xNa_zCo_{1-y}M_yO_2$ with a $P6_3mc$ space group in Embodiments 1 to 16 of this application is located between 17.5° and 19°, and the full width at half maximum of the crystal plane falls between 0.05 and 0.1. However, in the $Li_xNa_zCo_{1-y}M_yO_2$ with a non-$P6_3mc$ space group in Comparative Embodiments 1 to 4, no (002) crystal plane exists between 17.5° and 19°. In Comparative Embodiment 2, a (003) crystal plane exists at 19.2°. In Comparative Embodiments 1, 3, and 4, a (002) crystal plane exists at 16.8°, 16.5°, and 16.2°, respectively.

Further, referring to the XRD patterns in FIG. 3A to FIG. 3B, FIG. 3A is an XRD pattern of $Li_{0.73}Na_{0.02}CoO_2$ with a $P6_3mc$ space group according to Embodiment 1 of this application. As can be seen, the (002) crystal plane of the material is located between 17.5° and 19°, and the full width at half maximum of the crystal plane falls between 0.05 and 0.1. FIG. 3B is an XRD pattern of $Li_{0.8}Na_{0.006}Co_{0.983}Al_{0.015}Mg_{0.00202}$ with a non-$P6_3mc$ space group according to Comparative Embodiment 2 of this application. As can be seen, no (002) crystal plane of the material exists between 17.5° and 19°.

Analysis of the electrochemical data in Table 3 shows that the first-cycle discharge capacity and the $100^{th}$-cycle capacity retention rate of the lithium-ion battery containing the $Li_xNa_zCo_{1-y}M_yO_2$ with a $P6_3mc$ space group in Embodiments 1 to 16 of this application are significantly superior to the counterpart of the lithium-ion battery containing the $Li_xNa_zCo_{1-y}M_yO_2$ with a non-$P6_3mc$ space group in Comparative Embodiments 1 to 4.

Figure 4:
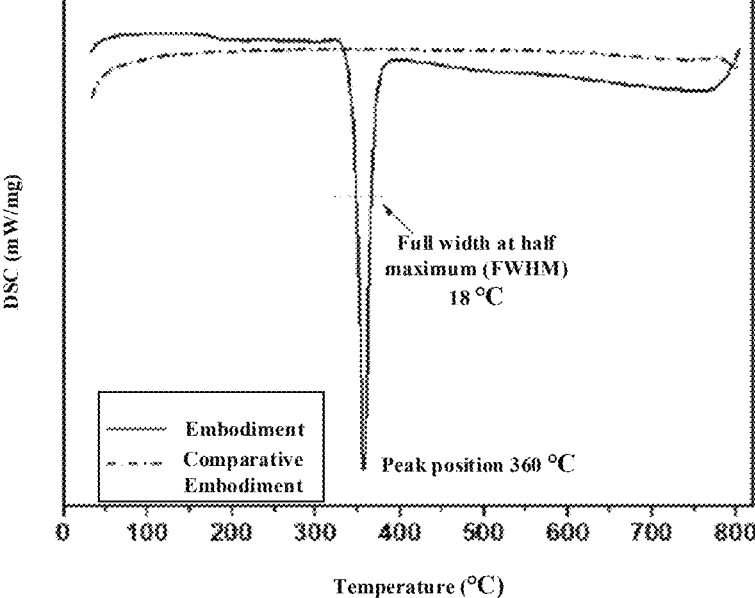
FIG. 4 is a differential scanning calorimetry (DSC) curve of a positive active material according to Embodiment 6 and Comparative Embodiment 1 of this application.
Figure 5A:
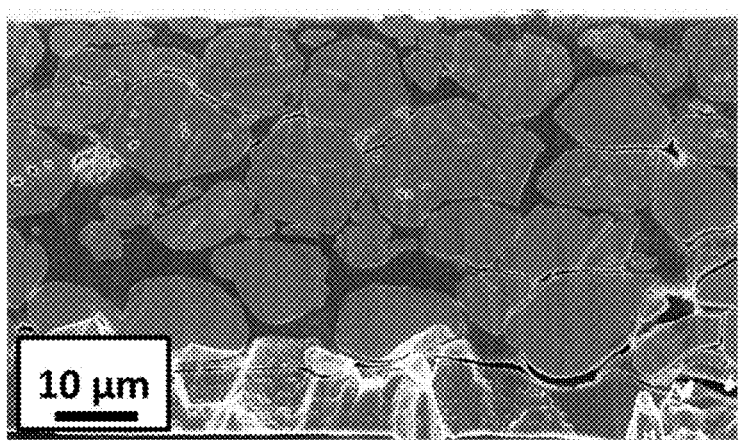
FIG. 5A and FIG. 5B are cross-section SEM images of the positive electrode plate of a battery 1 before a first cycle and after a 20th cycle respectively according to an embodiment of this application.
Figure 5B:
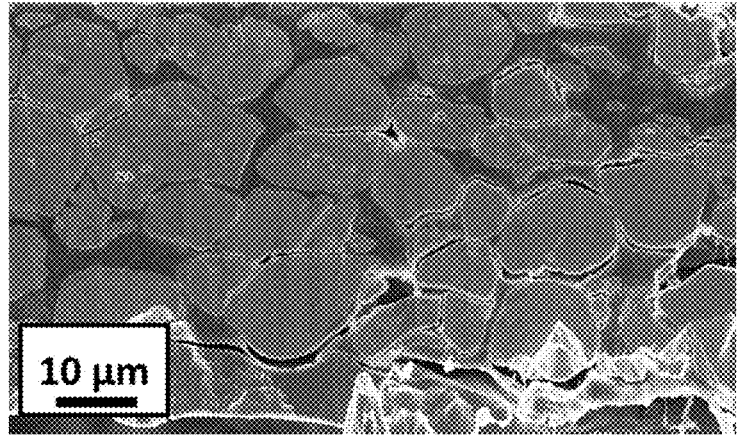
Figure 5C:
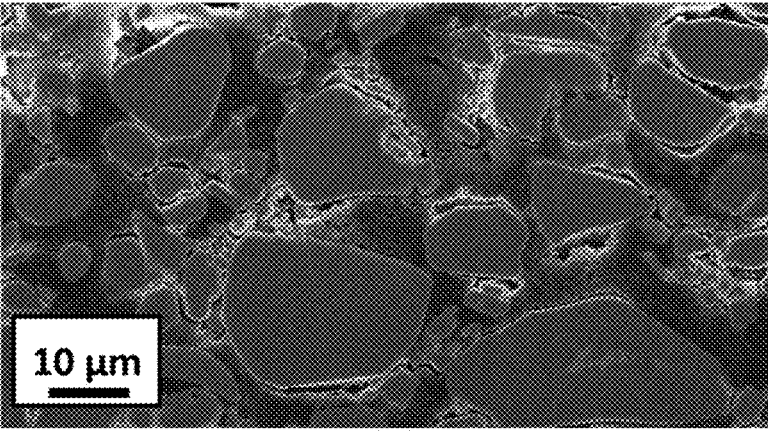
FIG. 5C and FIG. 5D are cross-section SEM images of a positive electrode plate of a battery 8 before a first cycle and after a 20th cycle respectively according to a comparative embodiment of this application.
Figure 5D:
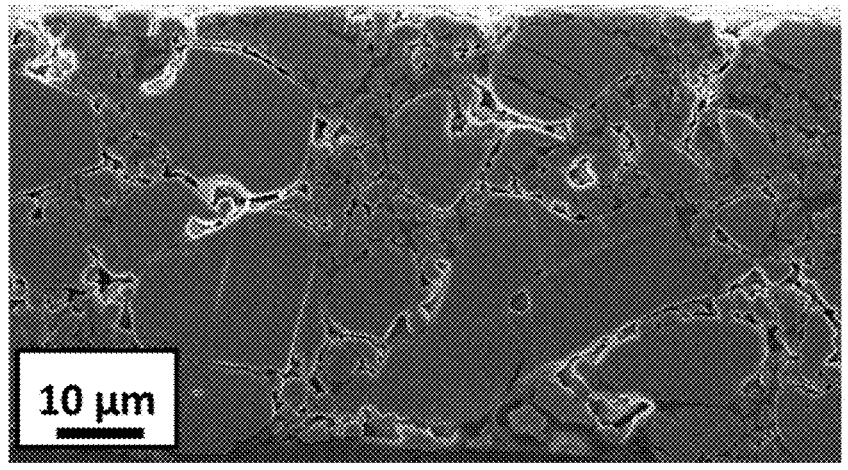

FIG. 4 is a differential scanning calorimetry (DSC) pattern of $Li_{0.73}Na_{0.01}Co_{0.985}Al_{0.015}O_2$ with a $P6_3mc$ space group of the positive active material in Embodiment 6 of this application and $Li_{0.58}Na_{0.01}Co_{0.985}Al_{0.015}O_2$ with a non-$P6_3mc$ space group in Comparative Embodiment 1. As can be seen, for the positive active material in Embodiment 6, an exothermic peak exists at 360° C., and the full width at half maximum of the exothermic peak is located at 18° C. However, for the positive active material in Comparative Embodiment 1, no exothermic peak exists in the foregoing range.

Through research, this applicant finds that the positive active materials according to all embodiments of this application exhibit an exothermic peak at 250° C. to 400° C., and the full width at half maximum of the exothermic peak is located at 15° C. to 40° C.

Table 4 below shows parameters such as $D_{50}$ and tap density of the materials, and pores and cracks in the particles according to Embodiment 6 and Embodiments 17 to 20. As can be seen from the table, the performance of the materials with different $D_{50}$ values, tap densities, and pores and cracks in such embodiments is superior to the counterpart in the comparative embodiments. The performance of the material in Embodiment 6 is even higher, in which the $D_{50}$ value is 10 μm to 30 μm, the tap density is 2.5 g/cm³ to 3 g/cm³, and pores and cracks exist.

TABLE 4

| Serial number | $D_{50}$ | Tap density (g/cm³) | Pores existent | Cracks existent | First-cycle discharge capacity (4.8 V) | 100th-cycle capacity retention rate |
|---|---|---|---|---|---|---|
| Embodiment 6 | 12 | 2.7 | Yes | Yes | 245 | 90% |
| Embodiment 17 | 9 | 2.2 | Yes | Yes | 239 | 89% |
| Embodiment 18 | 12 | 2.7 | No | Yes | 241 | 88% |
| Embodiment 19 | 12 | 2.7 | Yes | No | 241.5 | 89.9% |
| Embodiment 20 | 12 | 2.2 | Yes | Yes | 238 | 88.2% |

Table 5 below shows performance indicators of lithium-ion batteries containing a single-layered positive electrode plate prepared from the positive active material layers according to Embodiments 6, 7, 11, 13, 14, and Comparative Embodiments 1 and 2.

TABLE 5

| Serial number | First-cycle discharge capacity | DCR growth rate | Thickness of positive electrode by-product |
|---|---|---|---|
| Embodiment 6 | 240 | 1.30% | 0.22 |
| Embodiment 7 | 242 | 1.20% | 0.12 |
| Embodiment 11 | 241 | 1.20% | 0.21 |
| Embodiment 13 | 243 | 1.40% | 0.25 |
| Embodiment 14 | 243 | 1.20% | 0.32 |
| Comparative Embodiment 1 | 189 | 5.50% | 7.3 |
| Comparative Embodiment 2 | 250 | 4.90% | 19.8 |

Analysis of Table 5 shows that, compared with the lithium-ion battery containing the positive electrode plate prepared from the compound with a non-$P6_3mc$ space group in Comparative Embodiment 1, the lithium-ion batteries containing the positive electrode prepared from the compound with a $P6_3mc$ space group in Embodiments 6, 7, 11, 13, and 14 exhibit a significantly improved DCR growth rate, reduce the DCR growth rate to approximately 1% as against approximately 5% in the comparative embodiment, and decrease the thickness of the positive electrode by-product significantly. A main reason is that the positive active material according to this application suppresses crystal structure collapse and interface failure of a conventional $LiCoO_2$ material during charging (>4.6V vs. Li/Li⁺). The material exhibits desirable structural reversibility and cycle stability at a high voltage, and achieves at least, but without being limited to, the following advantages: (1) during lithiation, lithium vacancies exist in a crystal structure of the $Li_xNa_zCo_{1-y}M_yO_2$ positive electrode material, and can well allow for volume changes and intercalation of more lithium; (2) during delithiation or lithiation, pores and cracks existent in the $Li_xNa_zCo_{1-y}M_yO_2$ positive electrode material can effectively release a huge stress formed during high-voltage delithiation or lithiation, suppress an irreversible slip between layers, and achieve high cycle performance: (2) when the voltage is higher than 4.7 V, the $Li_xNa_zCo_{1-y}M_yO_2$ positive electrode material has completed deintercalation of 95% of lithium ions, and therefore, imposes a lower requirement on an oxidation-resistant (high-voltage) electrolytic solution than the positive electrode material in the O3 phase: (3) a tiny amount of Na is introduced during synthesis of the $Li_xNa_zCo_{1-y}M_yO_2$ positive electrode material, the Na occupies some sites of Li, and serves as a pillar to support the crystal structure, thereby enhancing the structural stability of the material: (4) lithium ion migration energy of the $Li_{x-}$ the undercoat with the slurry, and performing drying and cold calendering to obtain a double-layered positive electrode plate. The active material layer far away from the aluminum foil is hereinafter referred to as "a first layer", and the thickness ratio between the first layer and the second layer is controlled to be a given value (shown in Table 6).

Table 6 below shows specific parameters of the lithium-ion batteries (sequentially denoted as batteries 1 to 8) containing positive electrode plates. Some of the positive electrode plates are double-layered positive electrode plates prepared from both the positive active material in Embodiment 6 and another positive active material, and other positive electrode plates are a single-layered positive electrode plate prepared from the positive active materials in Embodiment 6 and Comparative Embodiment 1.

TABLE 6

| Serial number | First layer of positive active material | Second layer of positive active material | Thickness of first active layer/thickness of second active layer | Compacted density of double positive active layer (g/cm³) | Compacted density of second active layer (g/cm³) | Film resistance | First-cycle discharge capacity (4.8 V) | 100th-cycle capacity retention rate |
|---|---|---|---|---|---|---|---|---|
| Battery 1 | Positive active material in Embodiment 6 | $LiCo_{0.975}Al_{0.02}Mg_{0.005}O_2$ | 0.35 | 4.4 | 4.3 | 1.5 Ω | 237 | 89% |
| Battery 2 | Positive active material in Embodiment 6 | $LiCo_{0.975}Al_{0.02}Mg_{0.005}O_2$ | 1.2 | 4.35 | 4.25 | 1.2 Ω | 239 | 90% |
| Battery 3 | Positive active material in Embodiment 6 | $LiCo_{0.975}Al_{0.02}Mg_{0.005}O_2$ | 0.14 | 4.41 | 4.3 | 1.5 Ω | 238 | 91% |
| Battery 4 | Positive active material in Embodiment 6 | $LiNi_{1/3}Mn_{1/3}O_2$ | 0.15 | 4.4 | 4.3 | 1.5 Ω | 239.5 | 89.50% |
| Battery 5 | Positive active material in Embodiment 6 | $Li_{1.33}Ni_{0.72}Co_{0.1}Mn_{0.22}$ | 0.15 | 4.4 | 4.3 | 1.5 Ω | 240 | 90% |
| Battery 6 | Positive active material in Embodiment 6 | $Li_3Mn_3O_4$ | 0.15 | 4.4 | 4.3 | 1.5 Ω | 242 | 89.90% |
| Battery 7 | Positive active material in Embodiment 6 | None | None | None | 4.2 for a single layer | 1.8 Ω | 245 | 90% |
| Battery 8 | None | $LiCo_{0.975}Al_{0.02}Mg_{0.005}O_2$ | None | None | 4.1 for a single layer | 1.8 Ω | 245 | 50% |

$Na_zCo_{1-y}M_yO_2$ positive electrode material is lower than that of the $LiCoO_2$ in the O3 phase; and (5) an exemplary element M introduced in the $Li_xNa_zCo_{1-y}M_yO_2$ positive electrode material can enhance structural stability to some extent.

To further study the positive active material, this application further prepares a positive electrode plate containing a double-layered positive active layer by using the positive active material in Embodiment 6 (hereinafter referred to as a double-layered positive electrode plate), and further prepares a lithium-ion battery from the positive electrode plate. The preparation steps are described below.

Preparing a Double-Layered Positive Electrode Plate

Step (a): Mixing well a lower-layer positive active material (also known as "a second positive active material"), acetylene black as a conductive agent, and polyvinylidene difluoride (PVDF) as a binder in an N-methyl-pyrrolidone solvent system at a mass ratio of 97:2:1 to obtain a slurry. Coating a positive current collector aluminum foil with the slurry, and performing drying to obtain an undercoat. The active material layer close to the aluminum foil is hereinafter referred to as "a second layer".

Step (b): Mixing well the positive active material prepared in Embodiment 6 and Comparative Embodiment 1 separately (also known as "an upper-layer positive active material" or "a first positive active material"), acetylene black as a conductive agent, and polyvinylidene difluoride (PVDF) as a binder in an N-methyl-pyrrolidone solvent system at a mass ratio of 97:2:1 to obtain a slurry. Coating Analysis of Table 6 shows that, the capacity retention rate of the batteries 1 to 7 (where, the positive electrode plate in the battery 7 adopts a single active layer structure, and the positive active material includes the $LiCo_{0.975}Al_{0.02}Mg_{0.005}O_2$ with a $P6_3me$ space group; the positive electrode plates in the batteries 1 to 6 adopt double active layer structure, where the first layer includes the $Li_xNa_zCo_{1-y}M_yO_2$ with a $P6_3mc$ space group, and the second layer includes the $LiCo_{1-a}R_aO_2$ with an R-3m space group, a nickel-cobalt-manganese ternary material, a lithium-rich manganese-based material, or lithium manganese oxide) is significantly improved in contrast to the battery 8 (in the battery 8, the positive active material includes just the $LiCo_{0.975}Al_{0.02}Mg_{0.005}O_2$ with an R-3m space group). Specifically, as can be seen from FIG. 5 to FIG. 7, in contrast to the battery 8, the battery 1 is significantly improved in terms of the growth rate of cracked particles, capacity fading rate, thickness of the positive electrode by-product, average DCR growth rate, packing density of cobalt on the surface of the negative electrode plate, compacted density of the positive electrode plate, resistance of the positive electrode plate, and capacity fading rate after cycling at 4.8 V for 10 cycles and 100 cycles.

Referring to FIG. 5A to FIG. 5D, the test conditions are identical to those in the method for testing the growth rate of cracked particles, and it can be seen that: before the first cycle and after the 20th cycle, the morphology of the surface of the particles of the battery 1 containing the double-layer positive electrode plate prepared from the positive active material of Embodiment 6 is significantly superior to the battery 8 containing a single-layer positive electrode plate prepared from the $LiCo_{0.975}Al_{0.02}Mg_{0.005}O_2$ with a non-$P6_3me$ space group.

Figure 6:
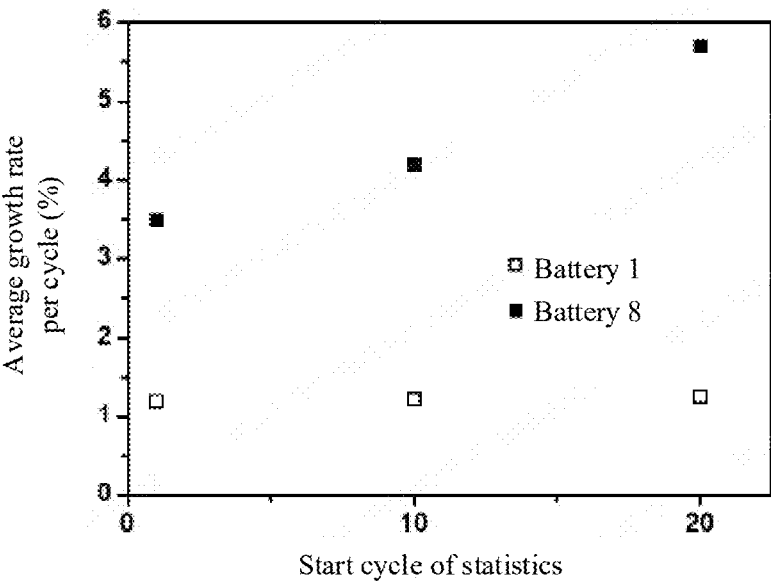
FIG. 6 is a comparison diagram of an average growth rate of a direct current resistance increasing with the increase of the cycle numbers of a battery 1 in an embodiment of this application versus a battery 8 in a comparative embodiment.

Referring to FIG. 6, the test conditions are identical to those of the DCR test, and it can be seen that: the DCR growth rate of the positive electrode plate of the battery 1 is significantly lower than that of the battery 8 after each cycle.

Figure 7:
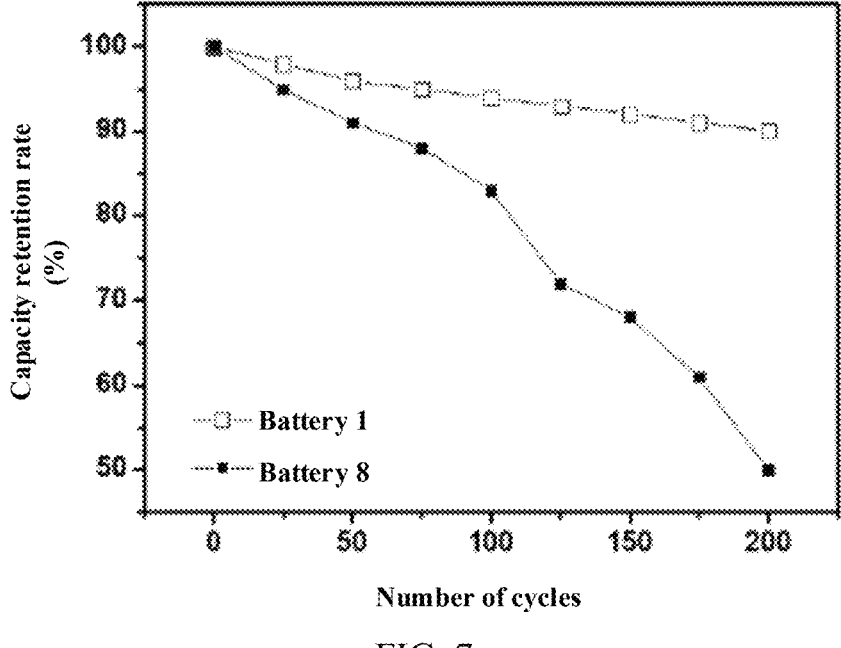
FIG. 7 is a comparison diagram of a capacity retention rate of a battery 1 in an embodiment of this application versus a battery 8 in Comparative Embodiment 1.

Referring to FIG. 7, the test conditions are identical to those of the capacity fading test method, and it can be seen that: from the first cycle until up to 200 cycles, the capacity retention rate of the battery 1 is always higher than that of the battery 8, and the tendency of the curve in FIG. 7 shows that the capacity retention rate of the battery 1 will continue to be higher than that of the battery S.

The foregoing excellent performance of the battery 1 mainly benefits from: (1) During delithiation or lithiation, due to inherent interface stability, the first positive active material in the first layer can well isolate and preclude the electrolytic solution from corroding an active surface of the second positive active material in the second layer, thereby maintaining the interface stability; (2) during delithiation or lithiation, due to existence of pores and cracks in the first positive active material in the first layer, the positive active material in the first layer can effectively release the huge stress formed by the high-voltage delithiation or lithiation, suppress the irreversible slip between layers, and achieve high cycle performance; (3) the first positive active material in the first layer is of high flexibility and can be compacted arbitrarily without affecting the thickness of the composite positive active layer, and the compacted density of the composite positive active layer is high; and (4) the doping elements introduced into the first positive active material in the first layer and the second positive active material in the second layer can effectively enhance the crystal structure stabilization effect.

To sum up, the electrochemical device containing the material according to this application at a high voltage of 4.8 V exhibits excellent structural reversibility and cycle stability.

References to "some embodiments", "part of embodiments", "an embodiment", "another example", "example", "specific example" or "some examples" throughout the specification mean that at least one embodiment or example in this application includes specific features, structures, materials, or characteristics described in the mentioned embodiment(s) or example(s). Therefore, descriptions throughout the specification, which make references by using expressions such as "in some embodiments", "in an embodiment", "in one embodiment", "in another example", "in an example", "in a specific example", or "example", do not necessarily refer to the same embodiment or example in this application. In addition, specific features, structures, materials, or characteristics herein may be combined in one or more embodiments or examples in any appropriate manner.

Although illustrative embodiments have been demonstrated and described above, a person skilled in the art understands that the foregoing embodiments are never to be construed as a limitation on this application, and changer, replacements, and modifications may be made to the embodiments without departing from the spirit, principles, and scope of this application.

What is claimed is:

1. A positive active material, comprising:
   a first positive active material containing a compound with a $P6_3mc$ space group, wherein, in an XRD pattern of the positive active material, a (002) crystal plane of the compound with the $P6_3mc$ space group is located between 17.5° and 19°, and a full width at half maximum of the (002) crystal plane falls between 0.05 and 0.1; and
   a second positive active material, the second positive active material is selected from $Li_{1\pm b}Co_{1-a}R_aO_2$ with an R-3m space group, a nickel cobalt manganese ternary material, a lithium-rich manganese-based material, and lithium manganese oxide, wherein $0 \leq b < 0.1$, $0 \leq a < 0.1$, and R comprises at least one selected from the group consisting of Al, Mg, Ti, Mn, Fe, Ni, Zn, Cu, Nb, Cr, and Zr;
   a first layer and a second layer, wherein the second layer is located between a current collector and the first layer, wherein the first layer comprises the first positive active material and the second layer comprises the second positive active material, a thickness ratio between the first layer and the second layer being 0.1 to 2.

2. The positive active material according to claim 1, wherein, in a DSC pattern of the first positive active material, an exothermic peak of the compound with the $P6_3mc$ space group exists between 250° C. and 400° C., and a full width at half maximum of the exothermic peak falls between 15° C. and 40° C.

3. The positive active material according to claim 1, wherein the compound with the $P6_3mc$ space group satisfies at least one of conditions (a) to (e):
   (a) an average particle diameter of the compound with the $P6_3mc$ space group is 8 μm to 30 μm;
   (b) a tap density of the compound with the $P6_3mc$ space group is 2.2 $g/cm^3$ to 3 $g/cm^3$;
   (c) pores exist on a particle of the compound with the $P6_3mc$ space group;
   (d) cracks exist inside the particle of the compound with the $P6_3mc$ space group; and
   (e) the compound with the $P6_3mc$ space group comprises $Li_xNa_zCo_{1-y}M_yO_2$, wherein $0.6 < x < 0.85$, $0 \leq y < 0.15$, $0 \leq z < 0.03$, and M comprises at least one selected from the group consisting of Al, Mg, Ti, Mn, Fe, Ni, Zn, Cu, Nb, Cr, and Zr.

4. An electrochemical device, comprising a positive electrode plate, the positive electrode plate comprises a positive current collector and a positive active layer disposed on at least one surface of the positive current collector, and the positive active layer comprises:
   a first positive active material containing a compound with a $P6_3mc$ space group, wherein, in an XRD pattern of the positive active material, a (002) crystal plane of the compound with the $P6_3mc$ space group is located between 17.5° and 19°, and a full width at half maximum of the (002) crystal plane falls between 0.05 and 0.1; and
   a second positive active material, the second positive active material is selected from $Li_{1\pm b}Co_{1-a}R_aO_2$ with an R-3m space group, a nickel cobalt manganese ternary material, a lithium-rich manganese-based material, and lithium manganese oxide, wherein $0 \leq b < 0.1$, $0 \leq a < 0.1$, and R comprises at least one selected from the group consisting of Al, Mg, Ti, Mn, Fe, Ni, Zn, Cu, Nb, Cr, and Zr;
   the positive active layer comprising a first layer and a second layer, wherein the second layer is located between the positive current collector and the first layer, wherein the first layer comprises the first positive active material and the second layer comprises the second positive active material, a thickness ratio between the first layer and the second layer being 0.1 to 2.

5. The electrochemical device according to claim 4, wherein, in a DSC pattern of the first positive active material, an exothermic peak of the compound with the $P6_3mc$ space group exists between 250° C. and 400° C., and a full width at half maximum of the exothermic peak falls between 15° C. and 40° C.

6. The electrochemical device according to claim 4, wherein the compound with the $P6_3mc$ space group satisfies at least one of conditions (a) to (e):

(a) an average particle diameter of the compound with the $P6_3mc$ space group is 8 μm to 30 μm;

(b) a tap density of the compound with the $P6_3mc$ space group is 2.2 $g/cm^3$ to 3 $g/cm^3$;

(c) pores exist on a particle of the compound with the $P6_3mc$ space group;

(d) cracks exist inside the particle of the compound with the $P6_3mc$ space group; and (e) the compound with the $P6_3mc$ space group comprises $Li_xNa_zCo_{1-y}M_yO_2$, wherein 0.6<x<0.85, 0≤y<0.15, 0≤z<0.03, and M comprises at least one selected from the group consisting of Al, Mg, Ti, Mn, Fe, Ni, Zn, Cu, Nb, Cr, and Zr.

7. The electrochemical device according to claim 4, wherein a compacted density of the second layer is 4.1 $g/cm^3$ to 4.35 $g/cm^3$.

8. The electrochemical device according to claim 4, wherein a compacted density of the positive active layer is 4.0 $g/cm^3$ to 4.5 $g/cm^3$.

9. The electrochemical device according to claim 4, wherein the electrochemical device is configured to satisfy at least one of conditions (f) to (h):

(f) a growth rate of cracked particles of the first positive active material is not higher than 5% as measured by cycling the electrochemical device for 20 cycles at a voltage of 4.8 V and a current rate of 0.5 C when a discharge capacity per gram is not less than 180 mAh/g;

(g) a growth rate of a direct current resistance DCR of the first positive active material per cycle on average is lower than 2% as measured by cycling the electrochemical device for 20 cycles at a voltage of 4.8 V and a current rate of 0.5 C when the discharge capacity per gram is not less than 180 mAh/g; and (h) the electrochemical device further comprises a negative electrode plate, the negative electrode plate comprises a negative current collector and a negative active layer disposed on at least one surface of the negative current collector, and an increment of a packing concentration of cobalt packed on a surface of the negative active layer per cycle on average is denoted by R; as measured by cycling the electrochemical device for 20 cycles at a voltage of 4.8 V and a current rate of 0.5 C when the discharge capacity per gram is not less than 180 mAh/g, wherein R≤5 ppm.

10. The electrochemical device according to claim 4, wherein, the electrochemical device is configured such that when a discharge capacity per gram of the electrochemical device is 180 mAh/g to 200 mAh/g, a thickness of a by-product of the positive electrode of the electrochemical device is denoted by η, wherein η≤0.5 μm.

11. An electronic device, comprising an electrochemical device, the electrochemical device comprises a positive electrode plate, the positive electrode plate comprises a positive current collector and a positive active layer disposed on at least one surface of the positive current collector, and the positive active layer comprises;

a first positive active material containing a compound with a $P6_3mc$ space group, wherein, in an XRD pattern of the positive active material, a (002) crystal plane of the compound with the P6: mc space group is located between 17.5° and 19°, and a full width at half maximum of the (002) crystal plane falls between 0.05 and 0.1; and a second positive active material, the second positive active material is selected from $Li_{1±b}Co_{1-a}R_aO_2$ with an R-3m space group, a nickel cobalt manganese ternary material, a lithium-rich manganese-based material, and lithium manganese oxide, wherein 0≤b<0.1, 0≤a<0.1, and R comprises at least one selected from the group consisting of Al, Mg, Ti, Mn, Fe, Ni, Zn, Cu, Nb, Cr, and Zr;

the positive active layer comprising a first layer and a second layer, wherein the second layer is located between the current collector and the first layer, wherein the first layer comprises the first positive active material and the second layer comprises the second positive active material, a thickness ratio between the first layer and the second layer being 0.1 to 2.

12. The electronic device according to claim 11, wherein, in a DSC pattern of the first positive active material, an exothermic peak of the compound with the $P6_3mc$ space group exists between 250° C. and 400° C., and a full width at half maximum of the exothermic peak falls between 15° C. and 40° C.

13. The electronic device according to claim 11, wherein the compound with the $P6_3mc$ space group satisfies at least one of conditions (a) to (e):

(a) an average particle diameter of the compound with the $P6_3mc$ space group is 8 μm to 30 μm;

(b) a tap density of the compound with the $P6_3mc$ space group is 2.2 $g/cm^3$ to 3 $g/cm^3$;

(c) pores exist on a particle of the compound with the $P6_3mc$ space group;

(d) cracks exist inside the particle of the compound with the $P6_3mc$ space group; and (e) the compound with the $P6_3mc$ space group comprises $Li_xNa_zCo_{1-y}M_yO_2$, wherein 0.6<x<0.85, 0≤y<0.15, 0≤z<0.03, and M comprises at least one selected from the group consisting of Al, Mg, Ti, Mn, Fe, Ni, Zn, Cu, Nb, Cr, and Zr.

14. The electronic device according to claim 11, wherein a compacted density of the second layer is 4.1 $g/cm^3$ to 4.35 $g/cm^3$.

* * * * *